United States Patent
Saito et al.

(10) Patent No.: US 7,343,159 B2
(45) Date of Patent: Mar. 11, 2008

(54) WIRELESS COMMUNICATION SYSTEM, TERMINAL, MESSAGE SENDING METHOD, AND PROGRAM FOR ALLOWING TERMINAL TO EXECUTE THE METHOD

(75) Inventors: Shin Saito, Kanagawa (JP); Hideyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 538 days.

(21) Appl. No.: 10/792,798

(22) Filed: Mar. 5, 2004

(65) Prior Publication Data

US 2005/0003814 A1 Jan. 6, 2005

(30) Foreign Application Priority Data

Mar. 6, 2003 (JP) ............... 2003/059358

(51) Int. Cl.
*H04Q 7/20* (2006.01)
(52) U.S. Cl. ............... 455/435.1; 455/422.1; 455/456.1; 455/404.2
(58) Field of Classification Search ............ 455/435.1, 455/456.1, 456.2, 456.3, 404.1, 404.2, 422; 380/30, 278, 279, 282, 258; 713/175, 168
See application file for complete search history.

(56) References Cited

U.S. PATENT DOCUMENTS 6,189,098 B1 * 2/2001 Kaliski, Jr. ............... 713/168

2002/0155845 A1 * 10/2002 Martorana ............... 455/456

FOREIGN PATENT DOCUMENTS

JP 11-146452 * 5/1999

OTHER PUBLICATIONS

U.S. Appl. No. 10/784,271, filed Feb. 24, 2004, Suzuki et al.
U.S. Appl. No. 10/792,798, filed Mar. 5, 2004, Saito et al.
U.S. Appl. No. 10/508,137, filed Sep. 17, 2004, Suzuki.
U.S. Appl. No. 11/742,989, filed May 1, 2007, Suzuki et al.

\* cited by examiner

*Primary Examiner*—Melur Ramakrishnaiah
(74) *Attorney, Agent, or Firm*—Oblon, Spivak, McClelland, Maier & Neustadt, P.C.

(57) ABSTRACT

Upon receiving a beacon, a terminal B sends a RTS control message to a terminal A before sending a registration request message to the terminal A. Upon receiving the RTS control message, the terminal A sends a CTS control message. The terminal B measures the time from when the RTS control message is sent to when the CTS control message is received so as to calculate the distance with the terminal A. If the distance with the terminal A is within a predetermined distance X1, the terminal B sends a registration request message to the terminal A. Similarly, the terminal A measures the distance with the terminal B, and sends a registration request acknowledgement message to the terminal B when the distance with the terminal B is within a predetermined distance X2.

8 Claims, 22 Drawing Sheets

FIG. 2

|  611 | 612 |
|---|---|
| TERMINAL IDENTIFIER #1 | PUBLIC KEY CERTIFICATE #1 |
| TERMINAL IDENTIFIER #2 | PUBLIC KEY CERTIFICATE #2 |
| ⋮ | ⋮ |

| ATTRIBUTE CERTIFICATE IDENTIFIER #1 | REVOCATION TIME #1 |
|---|---|
| ATTRIBUTE CERTIFICATE IDENTIFIER #2 | REVOCATION TIME #2 |
| ⋮ | ⋮ |

WIRELESS COMMUNICATION SYSTEM, TERMINAL, MESSAGE SENDING METHOD, AND PROGRAM FOR ALLOWING TERMINAL TO EXECUTE THE METHOD

BACKGROUND OF THE INVENTION

1. Field of the Invention

The present invention relates to wireless communication systems, and more particularly, to a wireless communication system, a terminal, and a message sending method in which, when the terminal sends a message to a communicating terminal, it performs ranging to measure the distance with the communicating terminal and checks that the communicating terminal is located within a predetermined range. The invention also pertains to a program for allowing the terminal to execute the message sending method.

2. Description of the Related Art

In a typical communication system, an attribute certificate is issued when a terminal is connected to a network, and by this attribute certificate, an access right of the terminal to connect to the network is certified. In a wireless communication system, however, since terminals are wirelessly connected to a network, wiretapping or posing is more encouraged than in a wired communication system. Accordingly, when issuing an attribute certificate, access from unspecified terminals must be restricted to reliably authenticate a communicating terminal.

Thus, when authenticating a communicating terminal, certificates are exchanged via physical media, for example, portable storage media, or via short-distance wireless media, for example, non-contact integrated circuit (IC) cards.

Additionally, a technique for improving the security by switching the transmission power or the modulation method between when authenticating a communicating terminal and when performing normal data communication has been proposed. For example, Japanese Unexamined Patent Application Publication No. 2000-295658 (FIG. 1) discloses the following technique. When performing wireless communication, the transmission power is progressively increased until there is a response from a communicating device, and communication is then performed for authenticating the communicating device at the level of transmission power when a response from the communicating device is returned. With this technique, the interception by the third party can be prevented.

In the method using physical media, however, although terminals are provided with wireless media, the user has to manually attach and remove the physical media, thereby decreasing the ease of operation. In the method using short-distance wireless media, short-distance wireless media should be sometimes used in terminals, which serve as intermediate-distance wireless media, thereby increasing the complexity of a system. In the method switching the transmission power or the modulation method, a switching control system becomes complicated, and also, retry should be made many times due to the influence of the communication quality when conducting authentication.

SUMMARY OF THE INVENTION

Accordingly, it is an object of the present invention to ensure, when a terminal sends a message to a communicating terminal, that the distance with the communicating terminal is within a predetermined range.

In order to achieve the above object, according to one aspect of the present invention, there is provided a wireless communication system including a plurality of terminals. The wireless communication system includes a first terminal for sending a signal including beacon information, and a second terminal for performing ranging to determine a distance with the first terminal in response to the signal, and for making a registration request to the first terminal when the determined distance is within a predetermined range. With this configuration, the second terminal can make a registration request to the first terminal by ensuring that the distance with the first terminal is within the predetermined range.

According to another aspect of the present invention, there is provided a wireless communication system including a plurality of terminals. The wireless communication system includes a fourth terminal for sending a signal including beacon information, and a third terminal for performing ranging to determine a distance with the fourth terminal in response to the signal, and for making a registration proposal to the fourth terminal when the determined distance is within a predetermined range. With this configuration, the third terminal can make a registration proposal to the fourth terminal by ensuring that the distance with the fourth terminal is within the predetermined range.

According to another aspect of the present invention, there is provided a wireless communication system including a plurality of terminals. The wireless communication system includes a first terminal for sending a signal including beacon information, and a second terminal for performing ranging to determine a distance with the first terminal in response to the signal, and for making a registration request to the first terminal when the determined distance is within a first predetermined range. The first terminal performs ranging to determine a distance with the second terminal in response to the registration request, and returns an acknowledgement of the registration request to the second terminal when the determined distance is within a second predetermined range. The second terminal and the first terminal can make a registration request and a registration request acknowledgement, respectively, by ensuring that the distance between the first terminal and the second terminal is within the predetermined range.

According to another aspect of the present invention, there is provided a wireless communication system including a plurality of terminals. The wireless communication system includes a fourth terminal for sending a signal including beacon information, and a third terminal for performing ranging to determine a distance with the fourth terminal in response to the signal, and for making a registration proposal to the fourth terminal when the determined distance is within a first predetermined range. The fourth terminal performs ranging to determine a distance with the third terminal in response to the registration proposal, and returns an acknowledgement of the registration proposal to the third terminal when the determined distance is within a second predetermined range. The third terminal and the fourth terminal can make a registration proposal and a registration proposal acknowledgement, respectively, by ensuring that the distance between the third terminal and the fourth terminal is within the predetermined range.

In the aforementioned wireless communication system, the second terminal may perform ranging to determine a distance with the first terminal in response to the acknowledgement, and may make an issuance request to issue a certificate of privilege to the first terminal when the determined distance is within a third predetermined range. The first terminal may perform ranging to determine a distance with the second terminal in response to the issuance request, and may issue a certificate of privilege to the second terminal when the determined distance is within a fourth predetermined range. With this configuration, the second terminal can make a certificate-of-privilege issuing request, and the first terminal can issue a certificate of privilege by ensuring that the distance between the first terminal and the second terminal is within the predetermined range.

In the aforementioned wireless communication system, the second terminal may perform ranging to determine a distance with the first terminal in response to the issuance of the certificate of privilege, and may return a reception acknowledgement of the certificate of privilege to the first terminal when the determined distance is within a fifth predetermined range. The first terminal may issue a revocation list of the certificate of privilege when the reception acknowledgement is not returned from the second terminal within a predetermined period after issuing the certificate of privilege. With this configuration, the acknowledgement of the certificate of privilege can be made between the second terminal and the first terminal by ensuring that the distance therebetween is within the predetermined range. When the acknowledgement of the certificate of privilege is not made within the predetermined period, the issued certificate of privilege is revoked.

In the above-described wireless communication system, the third terminal may perform ranging to determine a distance with the fourth terminal in response to the acknowledgement, and may issue a certificate of privilege to the fourth terminal when the determined distance is within a third predetermined range. The fourth terminal may perform ranging to determine a distance with the third terminal in response to the issuance of the certificate of privilege, and receives the certificate of privilege when the determined distance is within a fourth predetermined range. With this configuration, the third terminal can issue a certificate of privilege to the fourth terminal by ensuring that the distance between the fourth terminal and the third terminal is within the predetermined range.

In the above-described wireless communication system, the fourth terminal may return an issuing acknowledgement of the certificate of privilege to the third terminal when receiving the certificate of privilege issued from the third terminal. The third terminal may issue a revocation list of the certificate of privilege when the issuing acknowledgement is not returned from the fourth terminal within a predetermined period after issuing the certificate of privilege. With this configuration, the fourth terminal can make an issuing acknowledgement of the certificate of privilege to the third terminal by ensuring that the distance therebetween is within the predetermined range. When the issuing acknowledgement of the certificate of privilege is not made within the predetermined period, the issued certificate of privilege is revoked.

According to still another aspect of the present invention, there is provided a terminal including: a receiver for receiving a predetermined signal; a ranging unit for determining a distance with a first terminal when receiving the predetermined signal from the first terminal; and a sender for sending a predetermined message to the first terminal when the determined distance is within a predetermined range. With this configuration, when sending a message to the first terminal, the terminal can ensure that the distance with the first terminal is within the predetermined range.

In the aforementioned terminal, the ranging unit may determine the distance with the first terminal by performing communication with the first terminal. With this arrangement, it can be ensured that the distance between the terminals is within the predetermined distance by communication.

In the aforementioned terminal, the ranging unit may determine the distance with the first terminal by sending and receiving access control packets to and from the first terminal. With this arrangement, it can be ensured that the distance between the terminals is within the predetermined distance by sending and receiving access control packets.

In the aforementioned terminal, the ranging unit may determine the distance with the first terminal by a response signal from the first terminal in response to the communication with the first terminal. With this arrangement, it can be ensured that the distance between the terminals is within the predetermined distance by a response signal from the first terminal.

According to a further aspect of the present invention, there is provided a terminal including: a receiver for receiving a signal including beacon information; a ranging unit for determining a distance with a first terminal upon receiving the signal from the first terminal; and a registration request message sender for sending a registration request message when the determined distance is within a predetermined range. With this configuration, when sending a registration request message to the first terminal, the terminal can ensure that the distance with the first terminal is within the predetermined range.

According to a further aspect of the present invention, there is provided a terminal including: a receiver for receiving a signal including beacon information; a ranging unit for determining a distance with a first terminal upon receiving the signal from the first terminal; and a registration proposal message sender for sending a registration proposal message when the determined distance is within a predetermined range. With this configuration, when sending a registration proposal message to the first terminal, the terminal can ensure that the distance with the first terminal is within the predetermined range.

In the aforementioned terminal, the ranging unit may determine the distance with the first terminal by performing communication with the first terminal. With this arrangement, it can be ensured that the distance between the terminals is within the predetermined distance by communication.

In the aforementioned terminal, the ranging unit may determine the distance with the first terminal by sending and receiving access control packets to and from the first terminal. With this arrangement, it can be ensured that the distance between the terminals is within the predetermined distance by sending and receiving access control packets.

In the aforementioned terminal, the ranging unit may determine the distance with the first terminal by a response signal from the first terminal in response to the communication with the first terminal. With this arrangement, it can be ensured that the distance between the terminals is within the predetermined distance by a response signal from the first terminal.

In the aforementioned terminal, the registration request message sender may send a public key certificate of the terminal together with the registration request message when sending the registration request message. With this arrangement, the integrity of the terminal that has sent the registration request message can be authenticated by the first terminal receiving the registration request message.

In the above-described terminal, the registration proposal message sender may send a public key certificate of the terminal together with a registration proposal message when sending the registration proposal message. With this arrangement, the integrity of the terminal that has sent the registration proposal message can be authenticated by the first terminal receiving the registration proposal message.

According to a yet further aspect of the present invention, there is provided a message sending method including: a step of receiving a predetermined signal from a first terminal; a step of performing ranging to determine a distance with the first terminal; and a step of sending a predetermined message to the first terminal when the determined distance is within a predetermined range. With this configuration, when sending a registration request message to the first terminal, the terminal can ensure that the distance with the first terminal is within the predetermined range.

In the aforementioned message sending method, the predetermined signal may include beacon information.

According to a further aspect of the present invention, there is provided a message sending method including: a step of receiving a signal including beacon information from a first terminal; a step of performing ranging to determine a distance with the first terminal; and a step of sending a predetermined registration proposal message to the first terminal when the determined distance is within a predetermined range. With this configuration, when sending a registration proposal message to the first terminal, the terminal can ensure that the distance with the first terminal is within the predetermined range.

According to a further aspect of the present invention, there is provided a message sending method including: a step of receiving a signal including beacon information from a first terminal; a step of performing ranging to determine a distance with the first terminal at a first time; a step of sending a registration request message to the first terminal when the determined distance at the first time is within a first predetermined range; a step of receiving a registration request acknowledgement message from the first terminal in response to the registration request message; a step of performing ranging to determine a distance with the first terminal at a second time; and a step of sending a certificate-of-privilege issuing request message to the first terminal when the determined distance at the second time is within a second predetermined range. With this configuration, when sending a registration request message and a certificate-of-privilege issuing request message to the first terminal, the terminal can ensure that the distance with the first terminal at each request time is within the predetermined range.

According to a further aspect of the present invention, there is provided a message sending method including: a step of receiving a signal including beacon information from a first terminal; a step of performing ranging to determine a distance with the first terminal at a first time; a step of sending a registration proposal message to the first terminal when the determined distance at the first time is within a first predetermined range; a step of receiving a registration proposal acknowledgement message from the first terminal in response to the registration proposal message; a step of performing ranging to determine a distance with the first terminal at a second time; and a step of issuing a certificate of privilege to the first terminal and sending a certificate-of-privilege issuing message to the first terminal when the determined distance at the second time is within a second predetermined range. With this configuration, when sending a registration proposal message and a certificate-of-privilege issuing message to the first terminal, the terminal can ensure that the distance with the first terminal at each time is within the predetermined range.

According to a further aspect of the present invention, there is provided a program allowing a terminal to execute: a step of receiving a predetermined signal from a first terminal; a step of performing ranging to determine a distance with the first terminal; and a step of sending a predetermined message to the first terminal when the determined distance is within a predetermined range. With this configuration, when sending a registration request message to the first terminal, the terminal can ensure that the distance with the first terminal is within the predetermined range.

In the aforementioned program, the predetermined signal may include beacon information.

According to a further aspect of the present invention, there is provided a program allowing a terminal to execute: a step of receiving a signal including beacon information from a first terminal; a step of performing ranging to determine a distance with the first terminal; and a step of sending a registration proposal message to the first terminal when the determined distance is within a predetermined range. With this configuration, when sending a registration proposal message to the first terminal, the terminal can ensure that the distance with the first terminal is within the predetermined range.

According to a further aspect of the present invention, there is provided a program allowing a terminal to execute: a step of receiving a signal including beacon information from a first terminal; a step of performing ranging to determine a distance with the first terminal at a first time; a step of sending a registration request message to the first terminal when the determined distance at the first time is within a first predetermined range; a step of receiving a registration request acknowledgement message from the first terminal in response to the registration request message; a step of performing ranging to determine a distance with the first terminal at a second time; and a step of sending a certificate-of-privilege issuing request message to the first terminal when the determined distance at the second time is within a second predetermined range. With this configuration, when sending a registration request message and a certificate-of-privilege issuing request message to the first terminal, the terminal can ensure that the distance with the first terminal at each request time is within the predetermined range.

According to a further aspect of the present invention, there is provided a program allowing a terminal to execute: a step of receiving a signal including beacon information from a first terminal; a step of performing ranging to determine a distance with the first terminal at a first time; a step of sending a registration proposal message to the first terminal when the determined distance at the first time is within a first predetermined range; a step of receiving a registration proposal acknowledgement message from the first terminal in response to the registration proposal message; a step of performing ranging to determine a distance with the first terminal at a second time; and a step of issuing a certificate of privilege and sending a certificate-of-privilege issuing message to the first terminal when the determined distance at the second time is within a second predetermined range. With this configuration, when sending a registration proposal message and a certificate-of-privilege issuing message to the first terminal, the terminal can ensure that the distance with the first terminal at each time is within the predetermined range.

BRIEF DESCRIPTION OF THE DRAWINGS

FIG. 2 illustrates an example of the configuration of an attribute-certificate-issuing terminal list table 610 used in the embodiment of the present invention;

FIG. 5 illustrates an example of the configuration of an attribute-certificate revocation list table 630 used in the embodiment of the present invention;

DESCRIPTION OF THE PREFERRED EMBODIMENTS

The present invention is described in detail below with reference to the accompanying drawings through illustration of a preferred embodiment.

Figure 1:
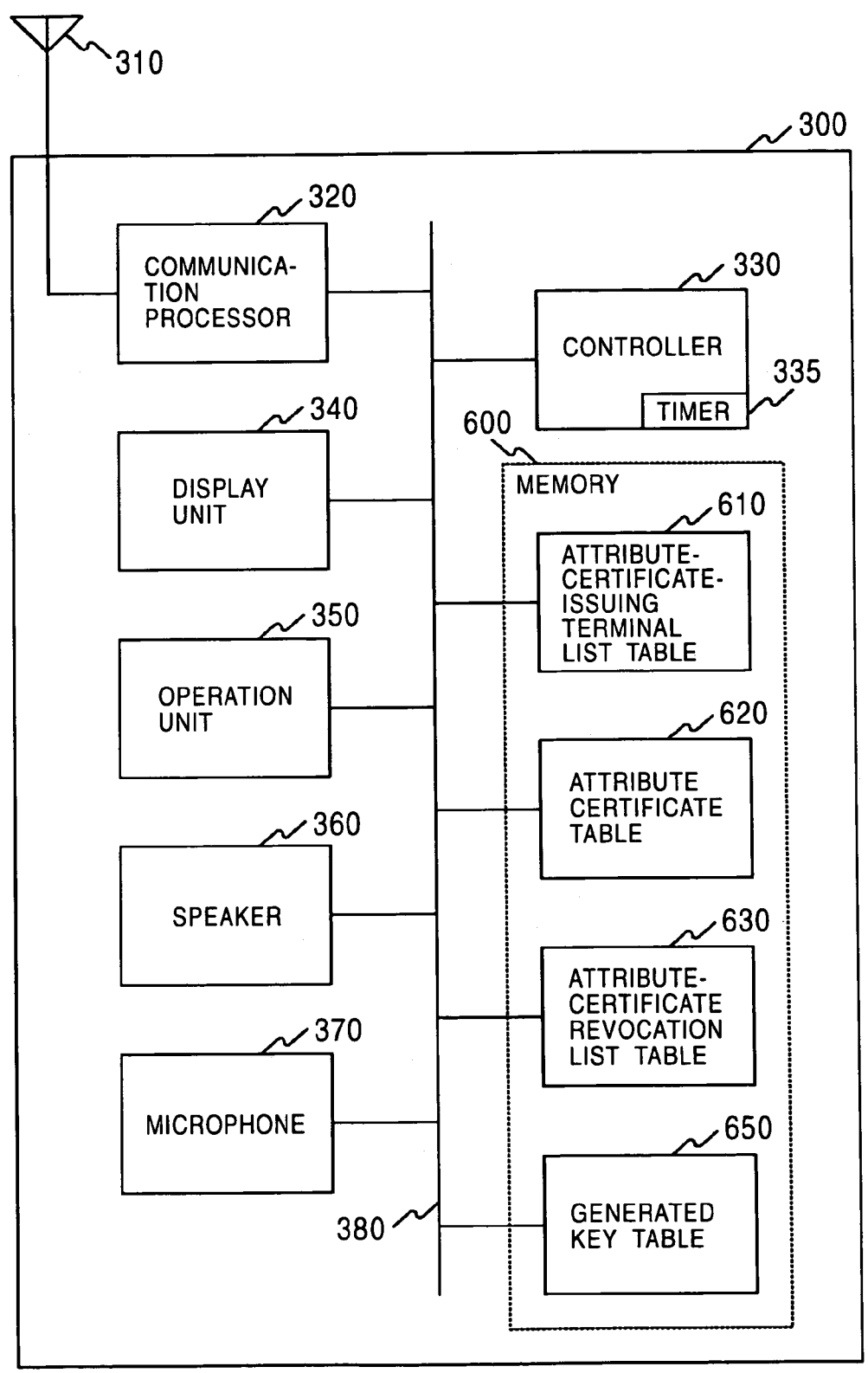
FIG. 1 is a block diagram illustrating the configuration of a wireless terminal 300 used in a wireless communication system according to an embodiment of the present invention.

FIG. 1 illustrates the configuration of a wireless terminal 300 used in a wireless communication system according to an embodiment of the present invention. The wireless terminal 300 includes a communication processor 320, a controller 330, a display unit 340, an operation unit 350, a speaker 360, a microphone 370, and a memory 600. These elements are connected to each other via a bus 380. An antenna 310 is connected to the communication processor 320. The communication processor 320 forms frames of the network interface layer (datalink layer) from a signal received via the antenna 310, and also transmits frames of the network interface layer via the antenna 310.

The controller 330 controls the overall wireless terminal 300; for example, it performs predetermined processing by referring to the frames formed by the communication processor 320. The controller 330 is provided with a timer 335 so that it counts a lapse of time after a predetermine event. The display unit 340, for example, a liquid crystal display, displays predetermined information; for example, information for issuing attribute certificates can be displayed by using a graphical user interface (GUI). The operation unit 350, for example, a keyboard or a button switch, is used for externally providing instructions, for example, an instruction to issue an attribute certificate, to the wireless terminal 300. The speaker 360 outputs sound to attract user's attention or to exchange audio information with other terminals. The microphone 370 inputs sound from an external source to the wireless terminal 300 to exchange audio information with other terminals and to provide instructions.

The memory 600 stores an attribute-certificate-issuing terminal list table 610 in which information concerning terminals that have issued attribute certificates are stored, an attribute certificate table 620 in which an attribute certificate indicating an access right of the wireless terminal 300 is stored, an attribute-certificate revocation list table 630 in which information concerning revoked attribute certificates is stored, and a generated key table 650 in which a public key, a private key, and a public key certificate are stored as information indicating the generated keys of the wireless terminal 300.

FIG. 2 illustrates an example of the configuration of the attribute-certificate-issuing terminal list table 610 used in this embodiment. The attribute-certificate-issuing terminal list table 610 stores information concerning terminals that issued attribute certificates in the past, and public key certificates 612 are associated with terminal identifiers 611 of the attribute-certificate issuing terminals. Any format may be used as the terminal identifiers 611 as long as it can uniquely identify the corresponding terminal in a network; for example, media access control (MAC) addresses in the Ethernet (registered) can be used. The public key certificates 612 are certificates of the terminals identified by the corresponding terminal identifiers 611. A public key certificate certifies the integrity of a certificate owner (subject), and includes a public key of the certificate owner. A signature is attached to the public key certificate by a certificate authority (CA), which is a certificate issuer. It should be noted that the public key of the CA has been distributed to each terminal.

Figure 3:
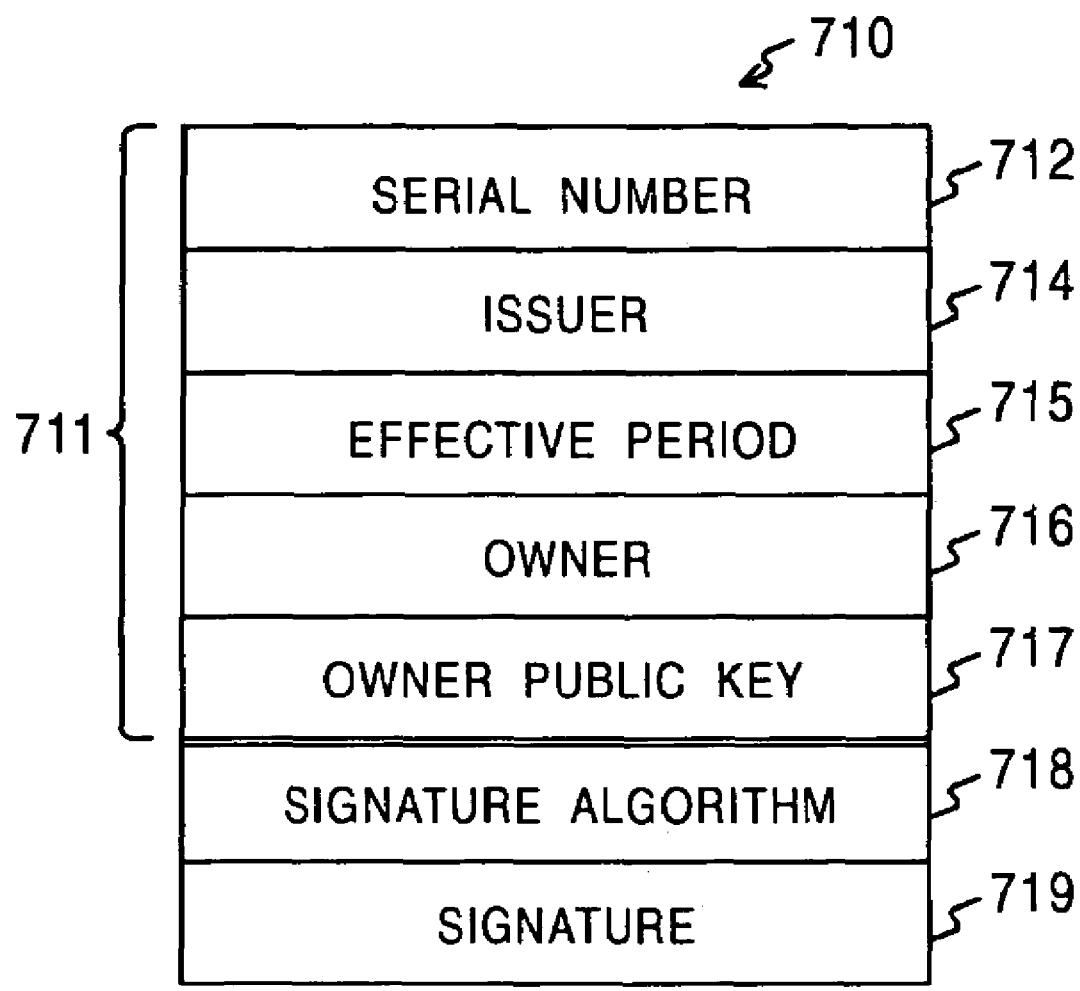
FIG. 3 illustrates a format 710 of a public key certificate 612 stored in the attribute-certificate-issuing terminal list table 610 used in the embodiment of the present invention.

FIG. 3 illustrates a format 710 of the public key certificate 612 of the attribute-certificate-issuing terminal list table 610.

The format 710 is mainly formed of a pre-signature certificate 711, a signature algorithm 718, and a signature 719. The pre-signature certificate 711 contains a serial number 712, an issuer 714, an effective period 715, an owner 716, and an owner public key 717.

The serial number 712 is the serial number of a public key certificate, and is numbered by the CA. The issuer 714 is the name of the CA, which is the issuer of the public key certificate. The public key certificate can be uniquely identified by the issuer 714 and the serial number 712. The effective period 715 is the effective period of the public key certificate. The owner 716 is the name of the owner of the public key certificate. The owner public key 717 is the public key of the owner 716.

The signature 719 is a signature attached to the public key certificate by the CA. The signature algorithm 718 is an algorithm used for generating this signature 719. The signature algorithm 719 consists of a message digest algorithm and a public key cryptosystem algorithm. The message digest algorithm is one of the hash functions (digest functions) and is an algorithm for generating a message digest of the pre-signature certificate 711. The message digest is a fixed-length bit string generated by compressing input data (pre-signature certificate 711), and is also referred to as a "seal" or a "fingerprint". As the message digest algorithm, for example, the secure hash algorithm-1 (SHA-1), the message digest #2 (MD2), and the message digest #5 (MD5), are known. The public key cryptosystem algorithm is an algorithm for encrypting a message digest generated by a message digest algorithm by using the private key of a CA. As the public key cryptosystem algorithm, for example, Rivest-Shamir-Adleman (RSA) based on the unique factorization problem and the digital signature algorithm (DSA) based on the discrete logarithm problem, are known. In this manner, the signature 719 is generated by encrypting the message digest of the pre-signature certificate 711 with the private key of the CA.

Accordingly, the message digest can be obtained by decrypting the signature 719 of the public key certificate with the public key of the CA. The user of the public key certificate generates a message digest of the pre-signature certificate 711 and compares it with the message digest decrypted by the public key of the CA. The user is then able to verify that the pre-signature certificate 711 is not tampered with.

Figure 4:
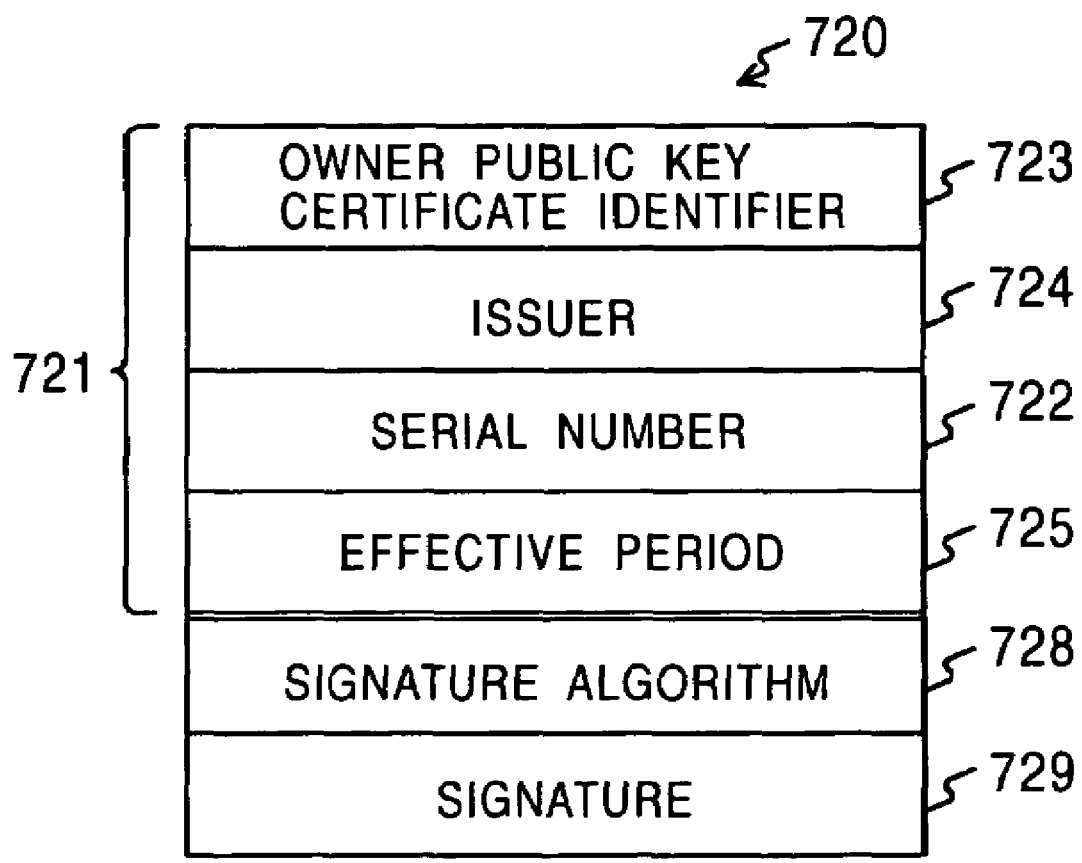
FIG. 4 illustrates the format of an attribute certificate 720 stored in an attribute certificate table 620 used in the embodiment of the present invention.

FIG. 4 illustrates the format of an attribute certificate 720 stored in the attribute certificate table 620. The attribute certificate 720 is mainly formed of attribute certificate information 721, a signature algorithm 728, and a signature 729. The attribute certificate information 721 contains an owner public key certificate identifier 723, an issuer 724, a serial number 722, and an effective period 725.

The owner public key certificate identifier 723 identifies the public key certificate of the owner of the attribute certificate 720, and more specifically, the public key certificate is identified by using the issuer 714 and the serial number 712 of the public key certificate 710 (FIG. 3). The issuer 724 is the name of an attribute certificate authority (AA), which is the issuer of the attribute certificate 720. The serial number 722 is a serial number of the attribute certificate 720 and is numbered by the AA. The attribute certificate 720 can be uniquely identified by the serial number 722 and the issuer 724. The effective period 725 is an effective period of the attribute certificate 720.

The signature 729 is a signature attached to the attribute certificate 720 by the AA. The signature algorithm 728 is an algorithm used for generating the signature 729. The signature algorithm 728 is similar to the signature algorithm 718 of the public key certificate, and the signature 729 is generated by encrypting the message digest of the attribute certificate information 721 with the private key of the AA.

Accordingly, the message digest can be obtained by decrypting the signature 729 of the attribute certificate 720 with the public key of the AA. The user of the attribute certificate 720 generates a message digest of the attribute certificate information 721 and compares it with the message digest decrypted with the public key of the AA. The user is then able to verify that the attribute certificate information 721 is not tampered with.

In this embodiment, the attribute certificate is described as an example of a certificate that serves to authorize a terminal to access a network (hereinafter simply referred to as a "certificate of privilege"). However, certificates of privilege may be described in, for example, extensible Markup Language (XML), and a signature is attached to the certificate of privilege by a corresponding authority. Such a certificate also functions as a certificate of privilege.

FIG. 5 illustrates an example of the configuration of the attribute-certificate revocation list table 630 used in this embodiment. The attribute-certificate revocation list table 630 stores information concerning revoked attribute certificates, and attribute certificate identifiers 631 of the revoked attribute certificates are associated with revocation time 632. When a terminal is lost or stolen, an attribute certificate revocation list (ARL) is issued for forcefully revoking the corresponding attribute certificate. A pair of the attribute certificate identifier 631 and the revocation time 632 is extracted from a revocation list entry and is stored in the attribute-certificate revocation list table 630. The attribute certificate identifier 631 identifies a revoked attribute certificate, and more specifically, a revoked attribute certificate is identified by the issuer 724 and the serial number 722 of the attribute certificate 720 (FIG. 4).

Figure 6:
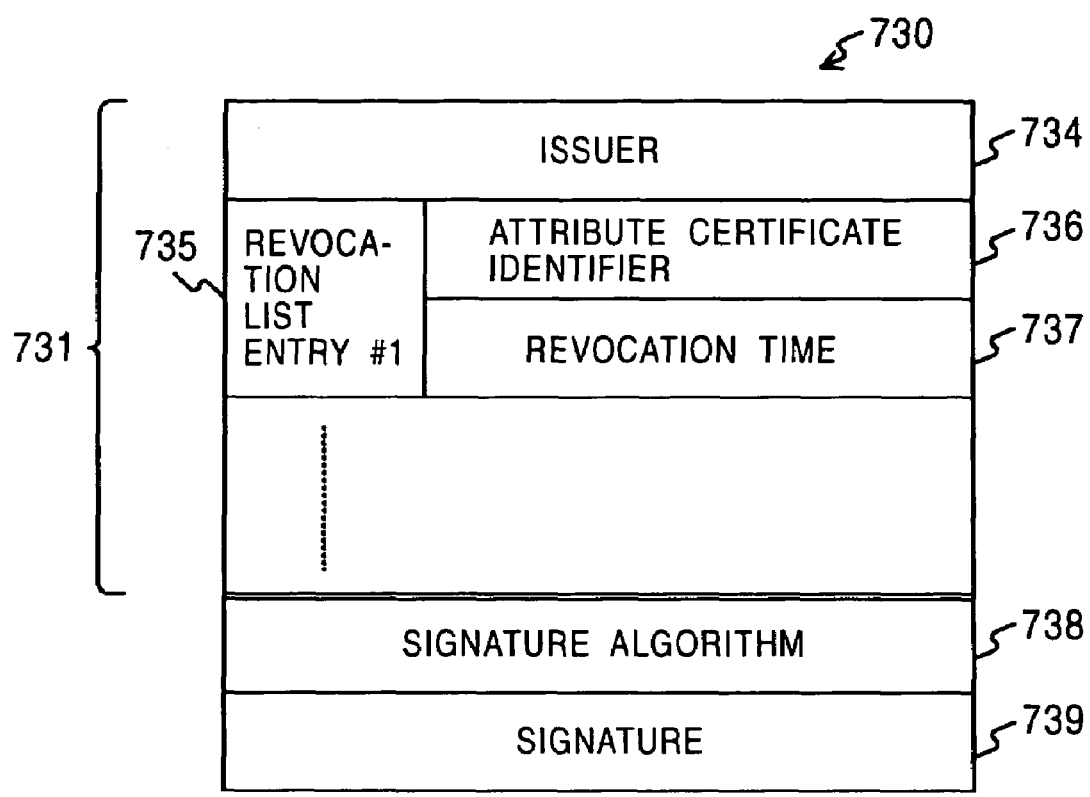
FIG. 6 illustrates the format of an attribute-certificate revocation list 730 used in the embodiment of the present invention.

FIG. 6 illustrates the format of an attribute-certificate revocation list 730. The attribute-certificate revocation list 730 is mainly formed of a pre-signature revocation list 731, a signature algorithm 738, and a signature 739. The pre-signature revocation list 731 contains an issuer 734 of the pre-signature revocation list 731 and a revocation list entry 735 (no revocation list entry or more than one revocation list entries may be contained). A pair of an attribute certificate identifier 736 and a revocation time 737 forms the revocation list entry 735. A pair of the attribute certificate identifier 736 and the revocation time 737 of the revocation list entry 735 corresponds to a pair of the attribute certificate identifier 631 and the revocation time 632 of the attribute-certificate revocation list table 630 (FIG. 5).

The signature 739 is a signature attached to the attribute-certificate revocation list 730 by the issuer 734. The signature algorithm 738 is an algorithm used for generating the signature 739. The signature algorithm 738 is similar to the signature algorithm 718 of the public key certificate, and the signature 739 is generated by encrypting the message digest of the pre-signature revocation list 731 with the private key of the issuer 734.

Accordingly, the message digest can be obtained by decrypting the signature 739 of the attribute-certificate revocation list 730 with the public key of the issuer 734. The user of the attribute-certificate revocation list 730 generates a message digest of the pre-signature revocation list 31 and compares it with the message digest decrypted with the public key of the issuer 734. The user is then able to verify that the pre-signature revocation list 731 is not tampered with.

In the wireless communication system of this embodiment, all the terminals forming a network can issue attribute-certificate revocation lists. A terminal that has issued an attribute-certificate revocation list distributes the list to the other terminals by broadcasting so that the validity of the attribute certificates can be verified in the other terminals. When re-connecting to the network, the terminals exchange the attribute-certificate revocation lists, and combine the attribute-certificate revocation list tables 630 stored in the terminals, thereby maintaining the latest status. When issuing an attribute-certificate revocation list, a public key certificate and an attribute certificate are desirably attached to the list so that the issuer can be easily authenticated.

Figure 7:
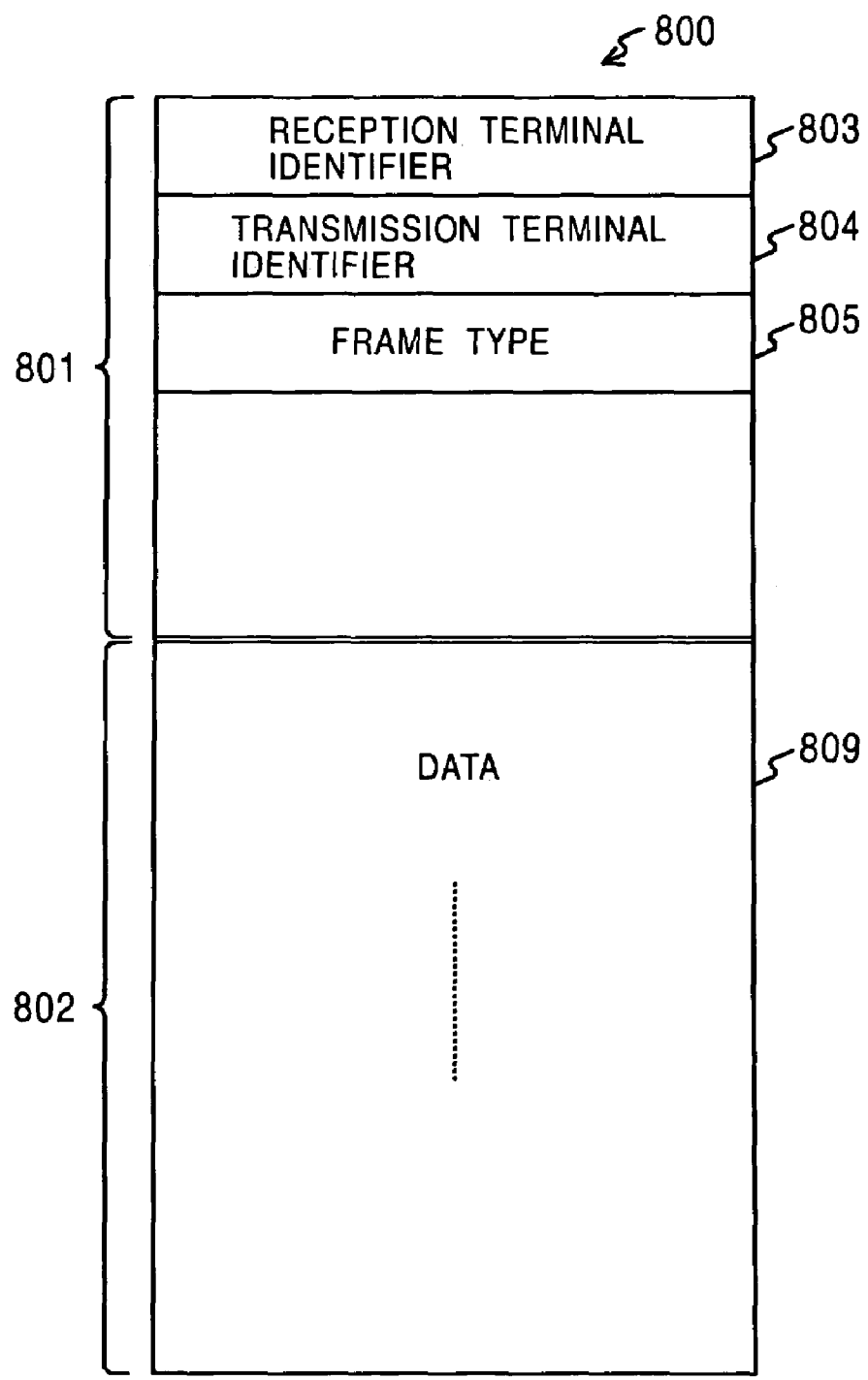
FIG. 7 illustrates the configuration of a frame 800 used in performing communication in the embodiment of the present invention.

FIG. 7 illustrates the configuration of a frame 800 used in communication in this embodiment. The frame 800 is mainly formed of a header 801 and a payload 802. The header 801 contains a reception terminal identifier 803, a transmission terminal identifier 804, and a frame type 805.

The reception terminal identifier 803 is the identifier of the terminal that has transmitted this frame. As the terminal identifier, as stated above, an identifier that can uniquely identify the corresponding terminal in the network should be used, for example, a MAC address in the Ethernet (registered), can be used. The transmission terminal identifier 804 is the identifier of the terminal that receives this frame. The frame type 805 indicates the type of this frame 800. The payload 802 stores data 809 to be sent and received. Generally, the payload 802 is encrypted and decrypted with an encryption key and a decryption key.

The operation of the wireless communication system of this embodiment is described below with reference to the accompanying drawings. As a pre-process before a terminal connects to a network resource, an authentication process by exchanging public key certificates and a registration process by issuing attribute certificates are performed. The above-described processes are implemented by the controller 330 of the wireless terminal 300.

Figure 8:
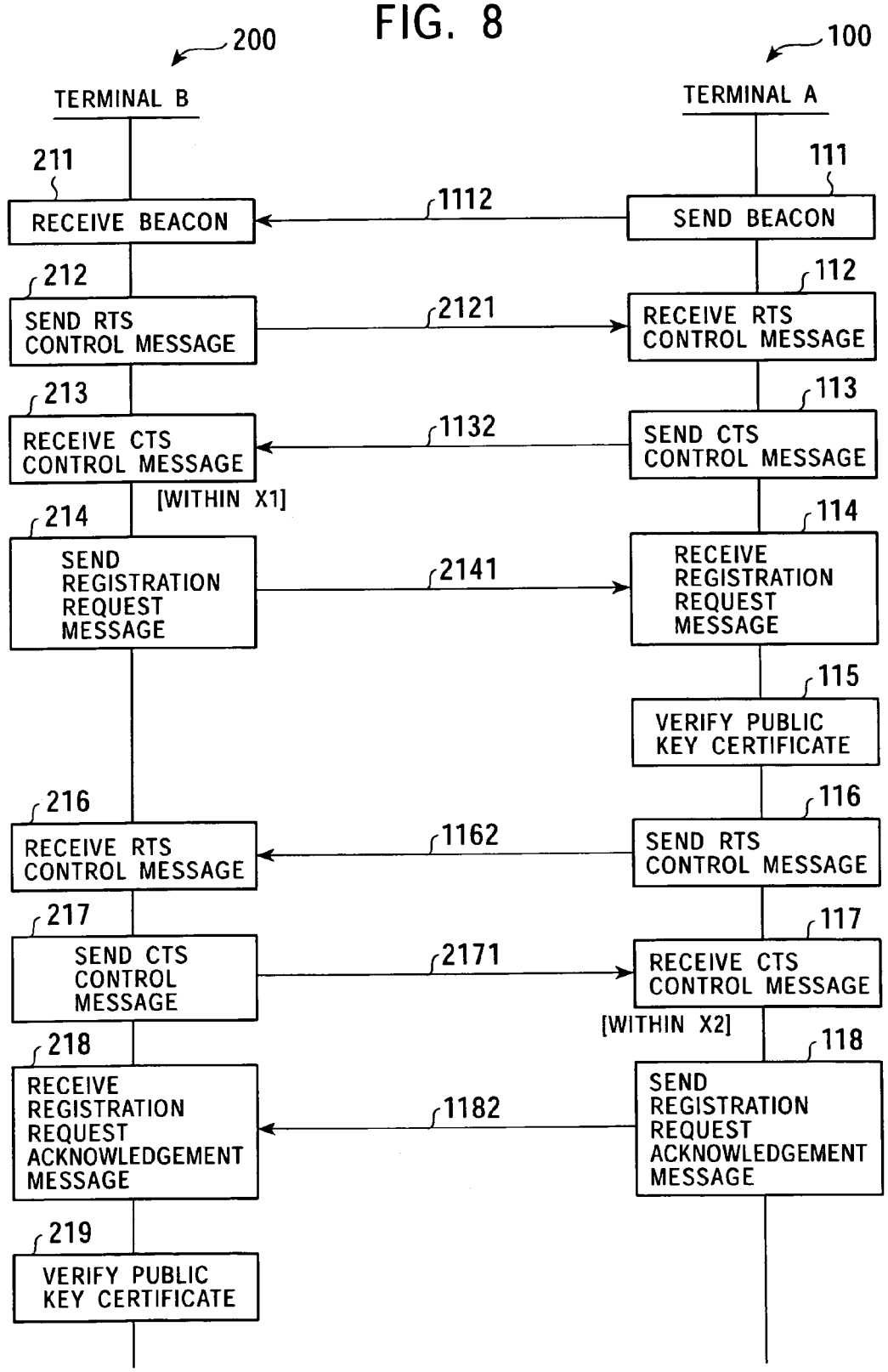
FIG. 8 illustrates an example of an authentication process in the embodiment of the present invention.

FIG. 8 illustrates an example of the authentication process in this embodiment. In FIG. 8, a terminal A (100) is an attribute-certificate issuing terminal, which has already entered the network, and a terminal B (200) is a terminal, which is to enter the network.

This authentication process is started by receiving a beacon from the terminal A by the terminal B. In a wireless communication system having a base station, the base station transmits a beacon, and the sub stations receive the beacon. In a wireless ad-hoc communication system without a base station, each terminal transmits a beacon to the other terminals so that the presence of each terminal can be made known to the other terminals. In this embodiment, the beacon includes, not only a beacon signal containing beacon information, but also data information added to the beacon information.

In step 111, the terminal A transmits a beacon 1112, and in step 211, the terminal B receives the beacon 1112. The configuration of the beacon 1112 is based on the configuration of the frame 800 shown in FIG. 7. In this beacon frame, the frame type 805 of the header 801 indicates that this frame is a beacon frame. After the frame type 805, the header 801 stores the identifier of the type of attribute certificate owned by the beacon transmission terminal (terminal A). As this identifier, for example, the identifier of the terminal that has issued the attribute certificate can be used. If a valid terminal identifier is not stored in this identifier field (for example, if only 0s are indicated in the identifier field), it means that the beacon transmission terminal (terminal A) does not own an attribute certificate.

Upon receiving the beacon 1112, the terminal B performs ranging to determine the current distance with the terminal A. In order to measure the distance, the terminal B communicates with the terminal A. In the example shown in FIG. 8, a request-to-send (RTS) control message and a clear-to-send (CTS) control message are used as access control packets for performing ranging. The RTS control message and the CTS control message are originally used for avoiding the contention between stations in wireless communication. A transmission terminal sends a RTS control message before sending data, and a reception terminal returns a CTS control message in response to the RTS control message. The other stations, which have not received the RTS control message, can also identify by receiving the CTS control message that a certain station has started to send data, thereby preventing interrupts. In this embodiment, by utilizing this mechanism, the time from when a RTS control message is sent to when a CTS control message is received is measured by using the timer 335 (FIG. 1), and the distance can be calculated from the measured time.

For example, the distance $D_{AB}$ between the terminal A and the terminal B can be calculated by the following equation:

$$D_{AB} = (1/2) V T_{TAT}$$

where $T_{TAT}$ represents the time from when the RTS control message is sent to when the CTS control message is received, and V designates the radio propagation velocity.

The radio propagation velocity V is $3 \times 10^8$ m, and thus, if the time $T_{TAT}$ is 100 ns, the distance $D_{AB}$ can be calculated as follows:

$$D_{AB} = (1/2) \times (3 \times 10^8) \times (100 \times 10^{-9}) = 15 \text{ m}.$$

Then, the distance between the terminal A and the terminal B is found to be 15 m.

The configuration of the RTS control message is based on the configuration of the frame 800 shown in FIG. 7. In the RTS frame, the frame type 805 of the header 801 indicates that this frame is a RTS frame. The same applies to the configuration of the CTS control message. In the CTS frame, the frame type 805 of the header 801 indicates that this frame is a CTS frame.

In step 212, the terminal B sends a RTS control message 2121 to the terminal A. Upon receiving the RTS control message 2121 in step 112, the terminal A returns a CTS control message 1132 to the terminal B in step 113. In step 213, the terminal B receives the CTS control message 1132 from the terminal A, and measures the time from when the RTS control message 2121 is sent to when the CTS control message 1132 is received by using the timer 335, thereby calculating the distance with the terminal A.

If the distance with the terminal A is within a predetermined distance X1, in step 214, the terminal B sends a registration request message 2141 to the terminal A. By restricting the distance with the terminal A within the predetermined distance X1, the registration request message 2141 can be prevented from being sent to unnecessary terminals. The configuration of the registration request message 2141 is based on the configuration of the frame 800 shown in FIG. 7. In the registration request frame, the frame type 805 of the header 801 indicates that this frame is a registration request frame. The data 809 of the payload 802 includes the public key certificate of the terminal B.

Upon receiving the registration request message 2141 from the terminal B in step 114, the terminal A verifies the public key certificate of the terminal B contained in the registration request message 2141 in step 115. After verifying the integrity of the terminal B, the terminal A measures the current distance with the terminal B. To measure the distance, in step 116, the terminal A sends a RTS control message 1162 to the terminal B in a manner similar to the above-described operation of the terminal B.

Upon receiving the RTS control message 1162 from the terminal A in step 216, the terminal B returns a CTS control message 2171 to the terminal A in response to the RTS control message 1162 in step 217. Upon receiving the CTS control message 2171 from the terminal B in step 117, the terminal A measures the time from when the RTS control message 1162 is sent to when the CTS control message 2171 is received by using the timer 335, thereby calculating the distance with the terminal B.

If the distance with the terminal B is within a predetermined distance X2, the terminal A sends a registration request acknowledgement message 1182 to the terminal B in step 118. By restricting the distance with the terminal B within the predetermined distance X2, the registration request acknowledgement message 1182 can be prevented from being sent to unnecessary terminals. The configuration of the registration request acknowledgement message 1182 is based on the configuration of the frame 800 shown in FIG. 7. In the registration request acknowledgement frame, the frame type 805 of the header 801 indicates that this frame is a registration request acknowledgement frame. The data 809 of the payload 802 includes the public key certificate of the terminal A.

In step 218, the terminal B receives the registration request acknowledgement message 1182 from the terminal A. If the time from when the registration request message 2141 is sent in step 214 to when the registration request acknowledgement message 1182 is received is within a predetermined time T1, the terminal B verifies the public key certificate of the terminal A contained in the registration request acknowledgement message 1182 in step 219. The reason for restricting the message response time within the predetermined time T1 is to assume the situation in which there may be no response due to a change in the communication status.

After verifying the integrity of the terminal A in step 219, the integrity of both the terminal A and the terminal B is authenticated.

Figure 9:
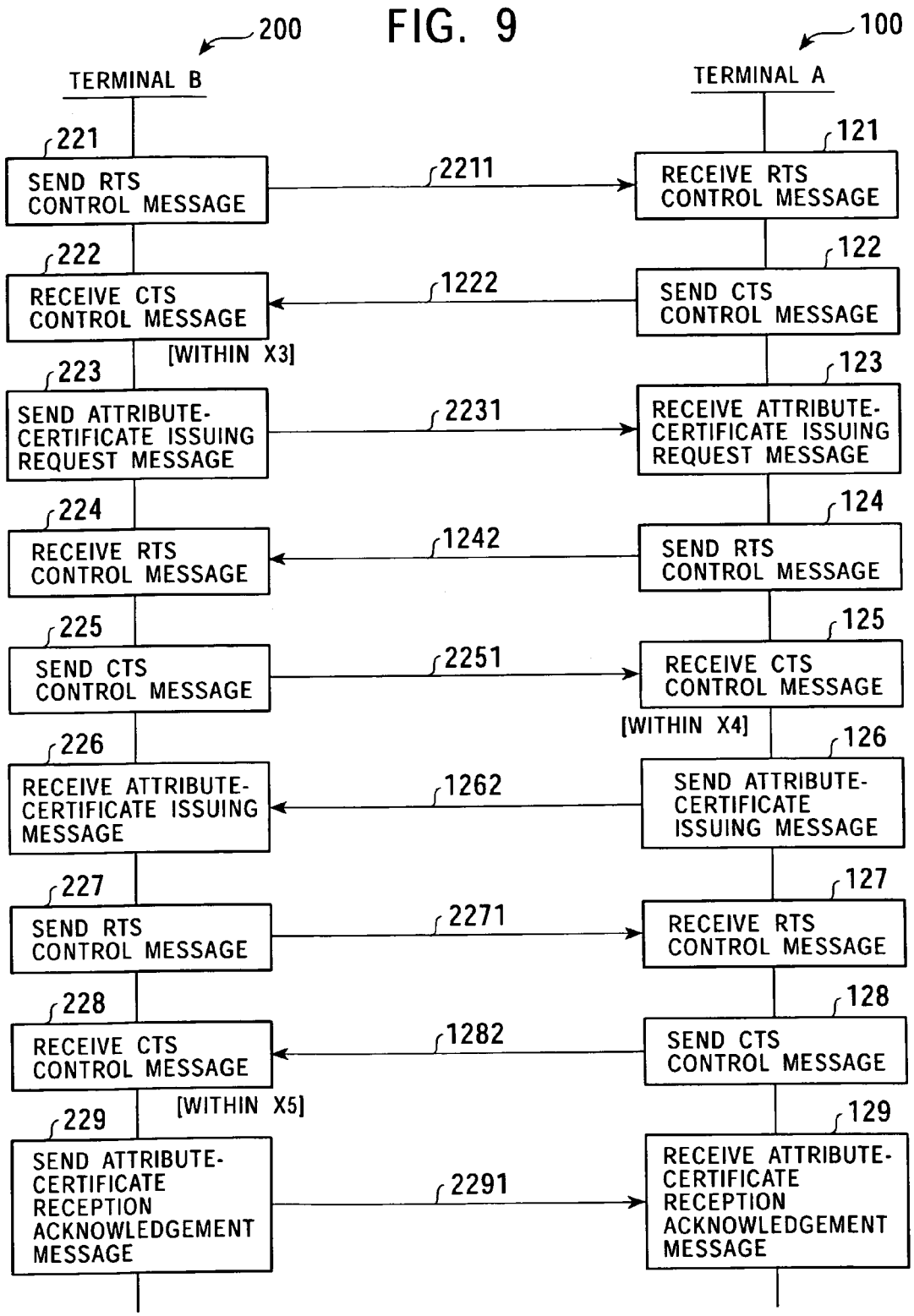
FIG. 9 illustrates an example of a registration process in the embodiment of the present invention.

FIG. 9 illustrates an example of the registration process of this embodiment. After verifying the integrity of the terminal A in step 219 in FIG. 8, the terminal B performs ranging to measure the current distance with the terminal A. To measure the distance, in step 221, the terminal B sends a RTS control message 2211 to the terminal A in a manner similar to the above-described operation.

After receiving the RTS control message 2211 from the terminal B in step 121, the terminal A returns a CTS control message 1222 to the terminal B in response to the RTS control message 2211 in step 122. In step 222, the terminal B receives the CTS control message 1222 from the terminal A, and then, measures the time from when the RTS control message 2211 is sent to when the CTS control message 1222 is received by using the timer 335, thereby calculating the distance with the terminal A.

If the distance with the terminal A is within a predetermined distance X3, in step 223, the terminal B sends an attribute-certificate issuing request message 2231 to the terminal A. By restricting the distance with the terminal A within the predetermined distance X3, the attribute-certificate issuing request message 2231 can be prevented from being sent to unnecessary terminals. The configuration of the attribute-certificate issuing request message 2231 is based on the configuration of the frame 800 shown in FIG. 7. In the attribute-certificate issuing request frame, the frame type 805 of the header 801 indicates that this frame is an attribute-certificate issuing request frame.

In step 123, the terminal A receives the attribute-certificate issuing request message 2231 from the terminal B. If the time from when the registration request acknowledgement message 1182 is sent in step 118 to when the attribute-certificate issuing request message 2231 is received is within a predetermined time T2, the terminal A measures the current distance with the terminal B. To measure the distance, in step 124, the terminal A sends a RTS control message 1242 to the terminal B in a manner similar to the above-described operation. The reason for restricting the message response time within the predetermined time T2 is to assume the situation in which there may be no response to the message due to a change in the communication status.

Upon receiving the RTS control message 1242 from the terminal A in step 224, the terminal B sends a CTS control message 2251 to the terminal A in step 225. Upon receiving the CRT control message 2251 from the terminal B in step 125, the terminal A measures the time from when the RTS control message 1242 is sent to when the CTS control message 2251 is received by using the timer 335, thereby calculating the distance with the terminal B.

If the distance with the terminal B is within a predetermined distance X4, in step 126, the terminal A sends an attribute-certificate issuing message 1262 to the terminal B. By restricting the distance with the terminal B within the predetermined distance X4, the attribute-certificate issuing message 1262 can be prevented from being sent to unnecessary terminals. The configuration of the attribute-certificate issuing message 1262 is based on the configuration of the frame 800 shown in FIG. 7. In the attribute-certificate issuing frame, the frame type 805 of the header 801 indicates that this frame is an attribute-certificate issuing frame. The data 809 of the payload 802 contains an attribute certificate.

In step 226, the terminal B receives the attribute-certificate issuing message 1262 from the terminal A. If the time from when the attribute-certificate issuing request message 2231 is sent in step 223 to when the attribute-certificate issuing message 1262 is received is within a predetermined time T3, the terminal B measures the current distance with the terminal A. To measure the distance, in step 227, the terminal B sends a RTS control message 2271 to the terminal A in a manner similar to the above-described operation. The reason for restricting the message response time within the predetermined time T3 is to assume the situation in which there may be no response to the message due to a change in the communication status.

Upon receiving the RTS control message 2271 from the terminal B in step 127, the terminal A sends a CTS control message 1282 to the terminal B in step 128. Upon receiving the CTS control message 1282 from the terminal A in step 228, the terminal B measures the time from when the RTS control message 2271 is sent in step 227 to when the CTS control message 1282 is received by using the timer 335, thereby calculating the distance with the terminal A.

If the distance with the terminal A is within a predetermined distance X5, the terminal B sends an attribute-certificate reception acknowledgement message 2291 to the terminal A in step 229. By restricting the distance with the terminal A within the predetermined distance X5, the attribute-certificate reception acknowledgement message 2291 can be prevented from being sent to unnecessary terminals. The configuration of the attribute-certificate reception acknowledgement message 2291 is based on the configuration of the frame 800 shown in FIG. 7. In the attribute-certificate reception acknowledgement frame, the frame type 805 of the header 801 indicates that this frame is an attribute-certificate reception acknowledgement frame.

In step 129, the terminal A receives the attribute-certificate reception acknowledgement message 2291 from the terminal B. If the time from when the attribute-certificate issuing message 1262 is sent in step 126 to when the attribute-certificate reception acknowledgement message 2291 is received is within a predetermined time T4, the terminal A determines the issued attribute certificate as a valid certificate. If the attribute-certificate reception acknowledgement message 2291 is not returned from the terminal B after the lapse of the predetermined time T4, the terminal A issues the attribute-certificate revocation list 730 to revoke the issued attribute certificate. The reason for restricting the message response time within the predetermined time T4 is to assume the situation in which there may be no response to the message due to a change in the communication status.

A description is now given of the processing performed by each terminal in the wireless communication system according to the present invention with reference to the accompanying drawings.

Figure 10:
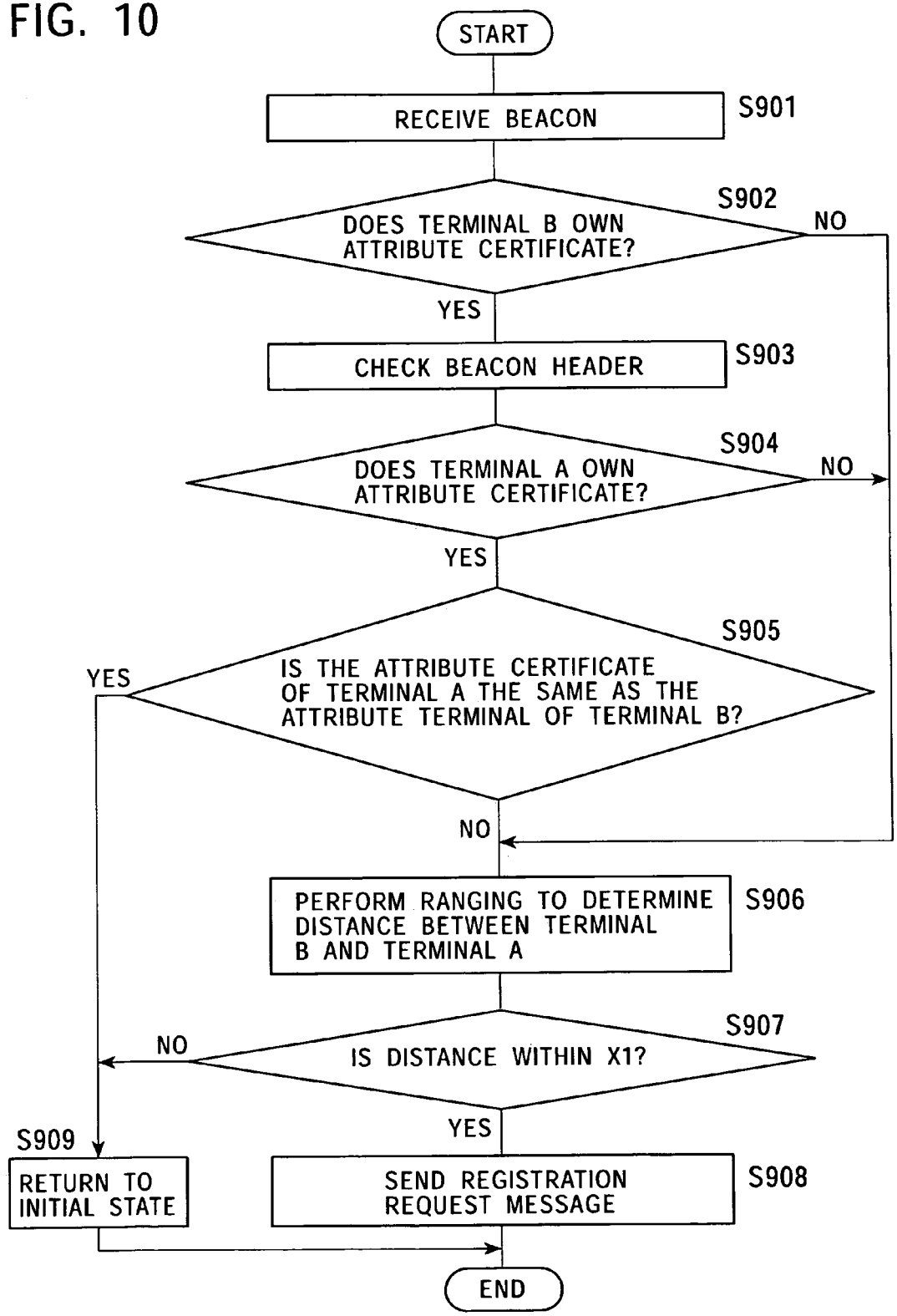
FIG. 10 is a flowchart illustrating registration request processing performed by terminal B in the embodiment of the present invention.

FIG. 10 is a flowchart illustrating the registration request processing performed by the terminal B shown in FIG. 8. Upon receiving a beacon from the terminal A in step S901, the terminal B determines in step S902 whether the terminal B owns an attribute certificate. If the terminal B is found to own an attribute certificate in step S902, it checks the beacon received from the terminal A in step S903. Then, the terminal B determines in step S904 whether the terminal A owns an attribute certificate. If the terminal A is found to own an attribute certificate in step S904, the terminal B determines in step S905 whether the attribute certificate of the terminal A has been issued by the same issuer which has issued the attribute certificate of the terminal B.

If it is found in step S905 that the attribute certificate of the terminal A and the attribute certificate of the terminal B have been issued by the same issuer, the terminal B returns to the initial state S909. If it is determined in step S902 or step S904 that the terminal B or the terminal A does not own an attribute certificate, or if it is determined in step S905 that the attribute certificate of the terminal B and the attribute certificate of the terminal A have not been issued by the same issuer (AA), the terminal B performs ranging to measure the distance with the terminal A in step S906. To measure the distance, communication is performed between the terminal B and the terminal A, as described above, by using, for example, a RTS control message and a CTS control message.

Then, the terminal B determines in step S907 whether the distance with the terminal A is within the predetermined distance X1. If the outcome of step S907 is yes, the terminal B sends a registration request message to the terminal A in step S908. If the distance with the terminal A is found to exceed the predetermined distance X1 in step S907, the terminal B returns to the initial state in step S909.

Figure 11:
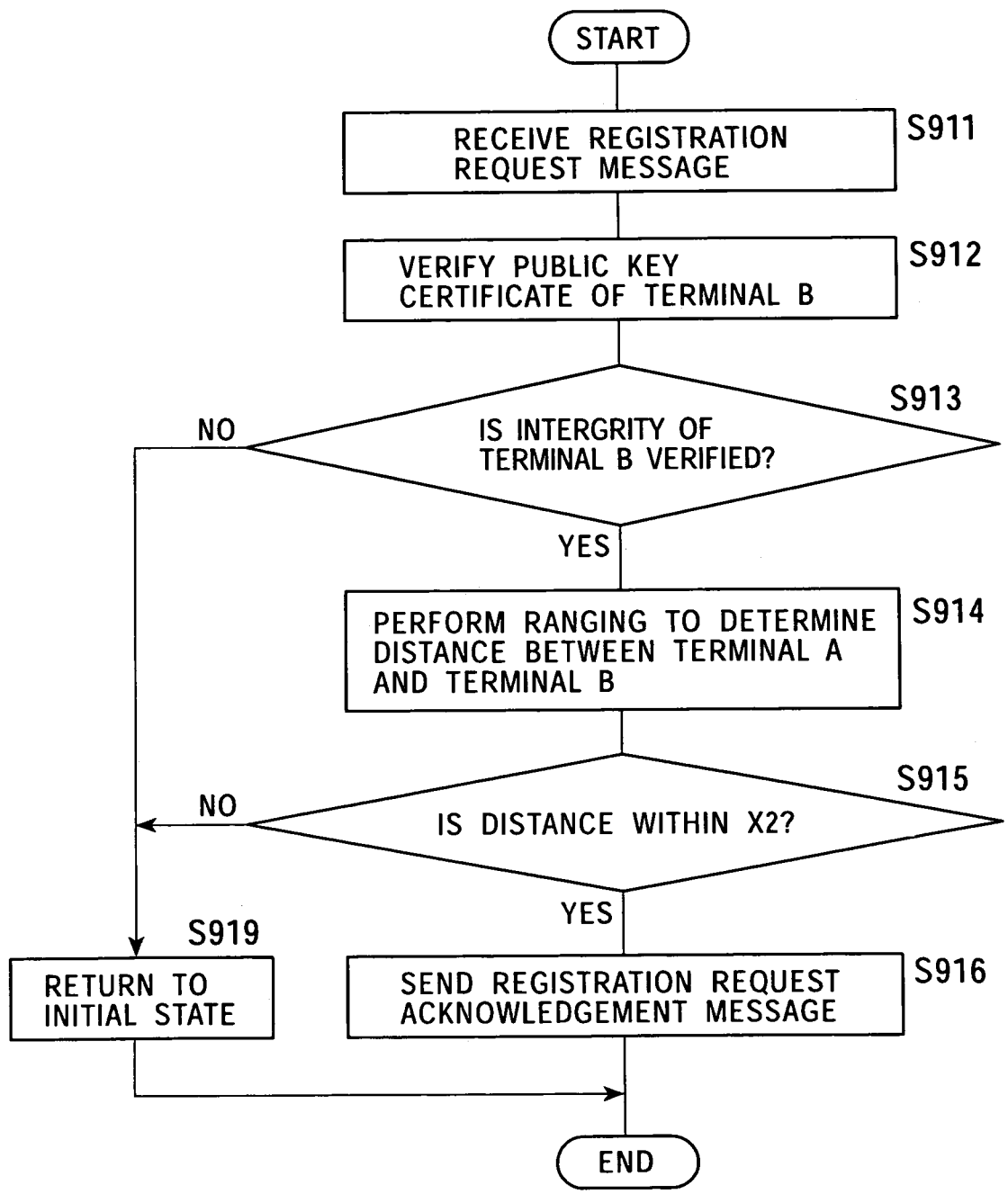
FIG. 11 is a flowchart illustrating registration request acknowledgement processing performed by terminal A in the embodiment of the present invention.

FIG. 11 is a flowchart illustrating the registration request acknowledgement processing performed by the terminal A shown in FIG. 8. In step S911, the terminal A receives the registration request message from the terminal B sent in step S908 of FIG. 10. Then, in step S912, the terminal A verifies the public key certificate of the terminal B contained in the registration request message. The verification of the public key certificate is performed by using the public key of the certificate authority (CA). The terminal A determines in step S913 whether the integrity of the terminal B is verified. If the outcome of step S913 is yes, the terminal A performs ranging to determine the distance with the terminal B in step S914. If it is determined in step S913 that the integrity of the terminal B cannot be verified, the terminal A returns to the initial state in step S919.

The terminal A determines in step S915 whether the distance with the terminal B is within the predetermined distance X2. If the result of step of S915 is yes, the terminal A sends a registration request acknowledgement message to the terminal B in step S916. If the distance with the terminal B is found to exceed the predetermined distance X2 in step S915, the terminal A returns to the initial state in step S919.

Figure 12:
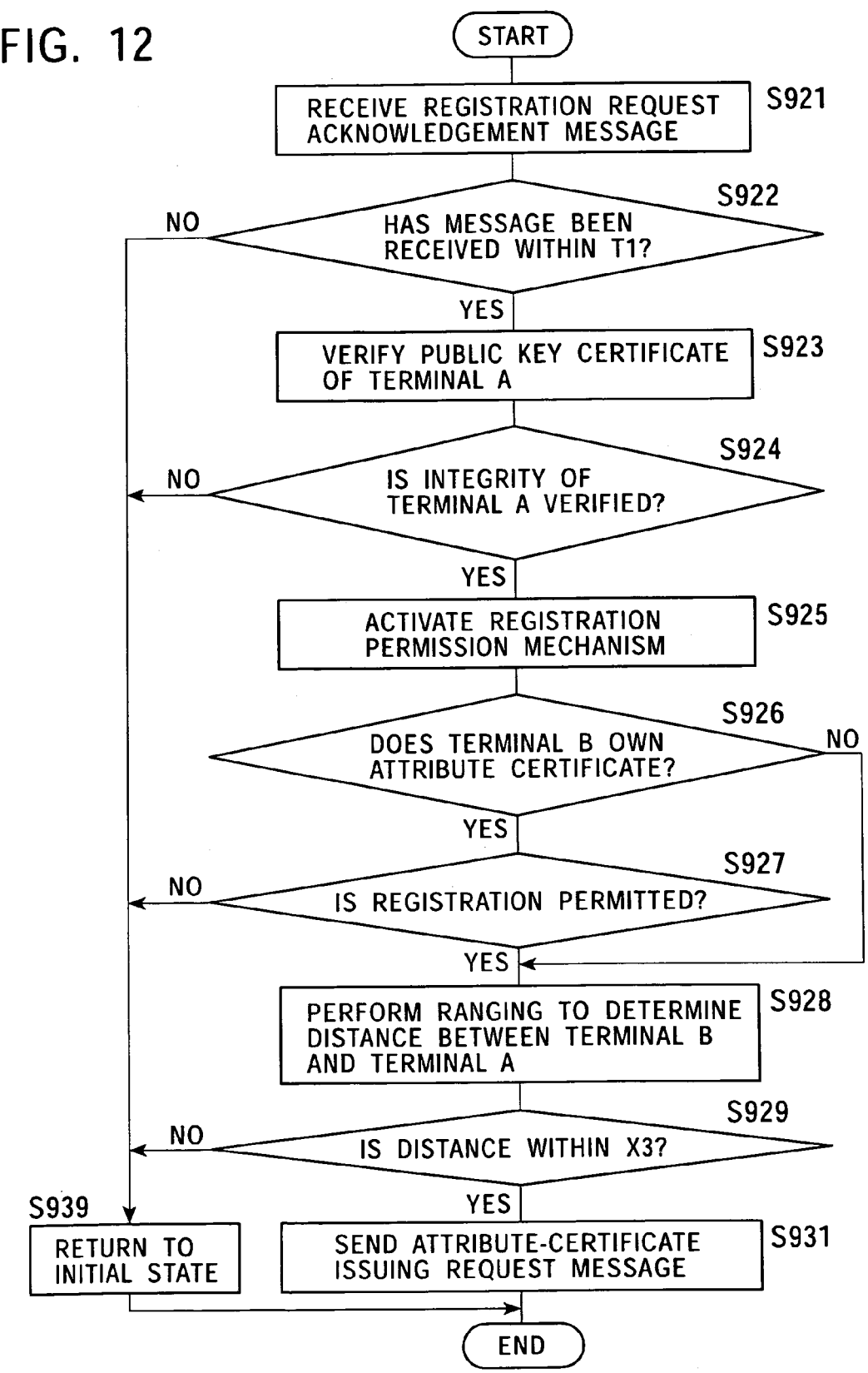
FIG. 12 is a flowchart illustrating attribute-certificate issuing request processing performed by terminal B in the embodiment of the present invention.

FIG. 12 is a flowchart illustrating the attribute-certificate issuing request processing performed by the terminal B shown in FIG. 9. In step S921, the terminal B receives the registration request acknowledgement message sent from the terminal A in step S916 of FIG. 11. The terminal B then determines in step S922 whether this message has been received within the predetermined time T1. If the result of step S922 is yes, the terminal B verifies the public key certificate of the terminal A contained in the registration request acknowledgement message in step S923. If it is found in step S922 that the registration request acknowledgement message has not been received within the predetermined time T1, the terminal B returns to the initial state in step S939.

The terminal B then determines in step S924 whether the integrity of the terminal A has been authenticated. If the outcome of step S924 is yes, the terminal B activates a registration permission mechanism in the terminal B in step S925. This registration permission mechanism is a mechanism for allowing the terminal B to request the issuance of an attribute certificate. For example, a message indicating a permission to make a request to issue an attribute certificate (not shown) can be displayed on the display unit 340 of the terminal B, or a vibrator mechanism can be operated, thereby instructing the user to input a registration permission from the operation unit 350. In contrast, if it is found in step S924 that the integrity of the terminal A cannot be verified, the terminal B returns to the initial state in step S939.

It is determined in step S926 whether the terminal B owns an attribute certificate. If the result of step S926 is yes, a determination is then made in step S927 as to whether a registration permission has been input in the above-described registration permission mechanism. If it is found in step S927 that a registration permission has not been input, the terminal B returns to the initial state in step S939.

In step S928, the terminal B performs ranging to determine the distance with the terminal A. It is then determined in step S929 whether the distance with the terminal A is within the predetermined distance X3. If the outcome of step S929 is yes, the terminal B sends an attribute-certificate issuing request message to the terminal A in step S931. If the distance with the terminal A is found to exceed the predetermined distance X3 in step S929, the terminal B returns to the initial state in step S939.

Figure 13:
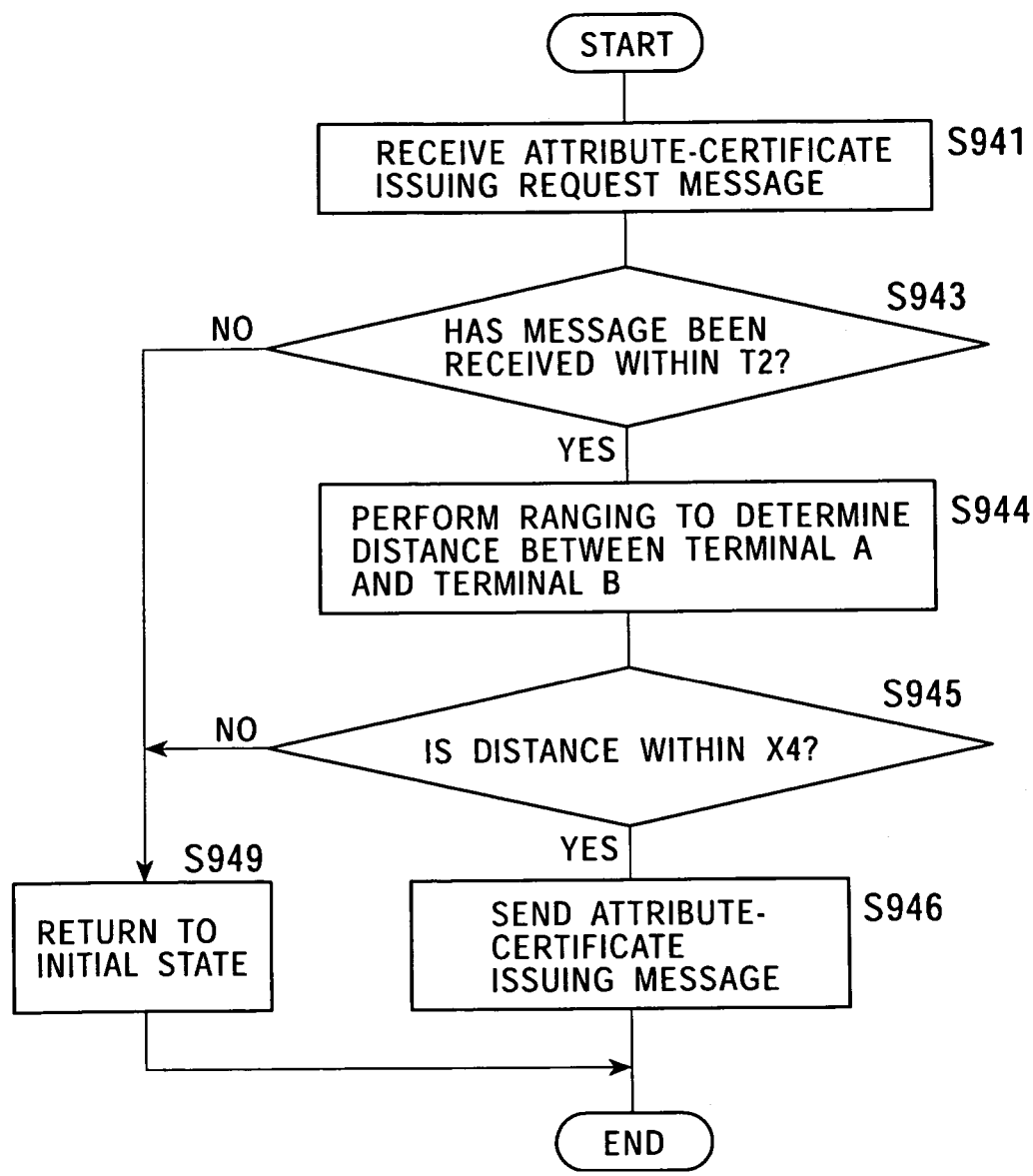
FIG. 13 is a flowchart illustrating attribute-certificate issuing processing performed by terminal A in the embodiment of the present invention.

FIG. 13 is a flowchart illustrating the attribute-certificate issuing processing performed by the terminal A shown in FIG. 9. In step S941, the terminal A receives the attribute-certificate issuing request message from the terminal B sent in step S931 of FIG. 12. The terminal A then determines in step S943 whether the time from when the registration request acknowledgement message is sent in step S916 to when the attribute-certificate issuing request message is received in step S941 is within the predetermined time T2. If the result of step S943 is yes, the terminal A performs ranging to determine the distance with the terminal B in step S944. If it is found in step S943 that the message has not been received within the predetermined time T2, the terminal A returns to the initial state in step S949.

The terminal A then determines in step S945 whether the distance with the terminal B is within the predetermined distance X4. If the result of step S945 is yes, the terminal A sends an attribute-certificate issuing message to the terminal B in step S946. If the distance is found to exceed the predetermined distance X4 in step S945, the terminal A returns to the initial state in step S949.

Figure 14:
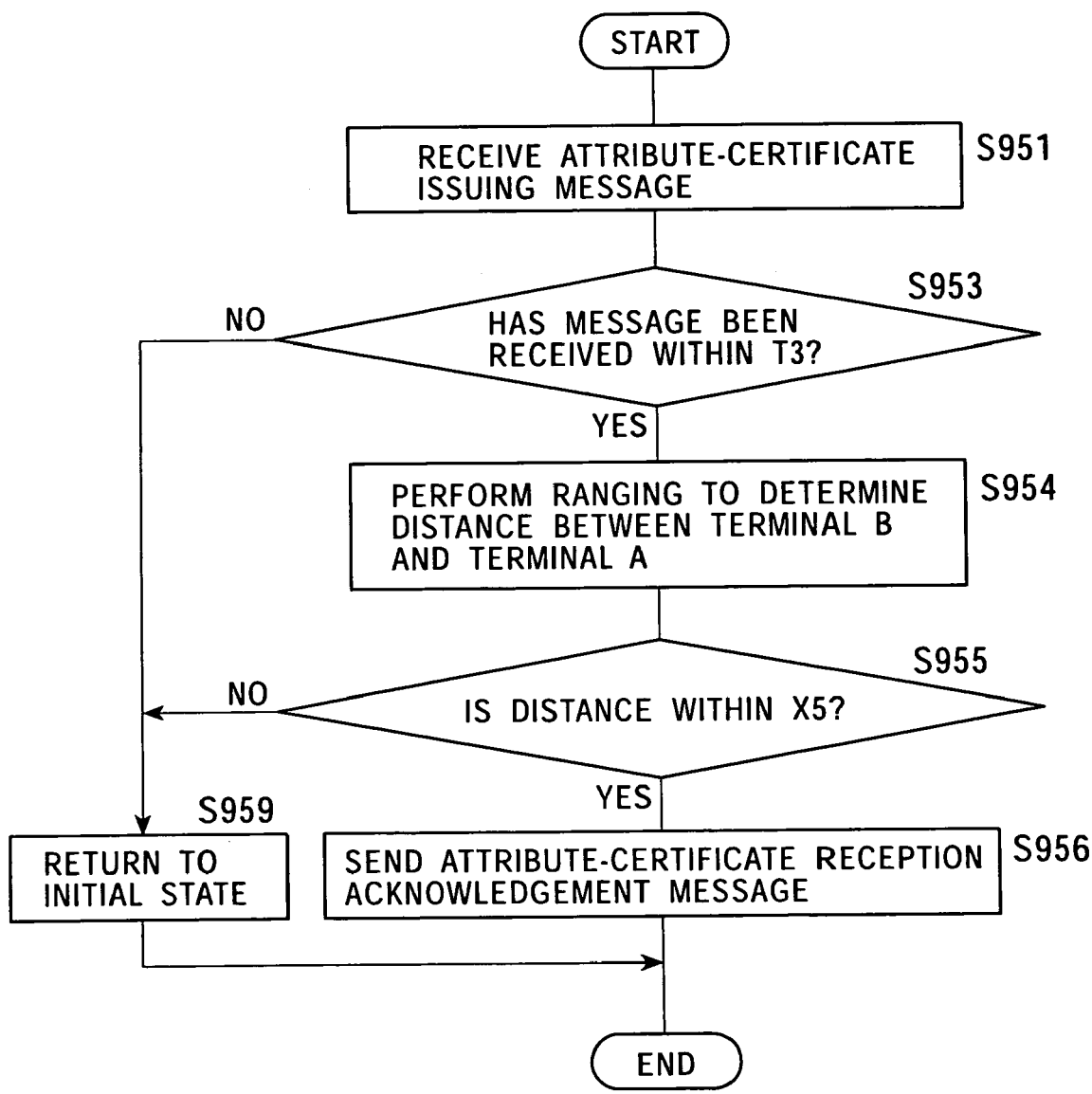
FIG. 14 is a flowchart illustrating attribute-certificate reception acknowledgement processing performed by terminal B in the embodiment of the present invention.

FIG. 14 is a flowchart illustrating the attribute-certificate reception acknowledgement processing performed by the terminal B shown in FIG. 9. In step S951, the terminal B receives the attribute-certificate issuing message from the terminal A sent in step S946 of FIG. 13. The terminal B then determines in step S953 whether the time from when the attribute-certificate issuing request message is sent to when the attribute-certificate issuing message is received is within the predetermined time T3. If the outcome of step S953 is yes, the terminal B performs ranging to determine the distance with the terminal A in step S954. If it is found in step S953 that the message has not been received within the predetermined time T3, the terminal B returns to the initial state in step S959.

The terminal B then determines in step S955 whether the distance with the terminal A is within the predetermined distance X5. If the outcome of step S955 is yes, the terminal B sends an attribute-certificate reception acknowledgement message to the terminal A in step S956. If the distance is found to exceed the predetermined distance X5 in step S955, the terminal B returns to the initial state in step S959.

Figure 15:
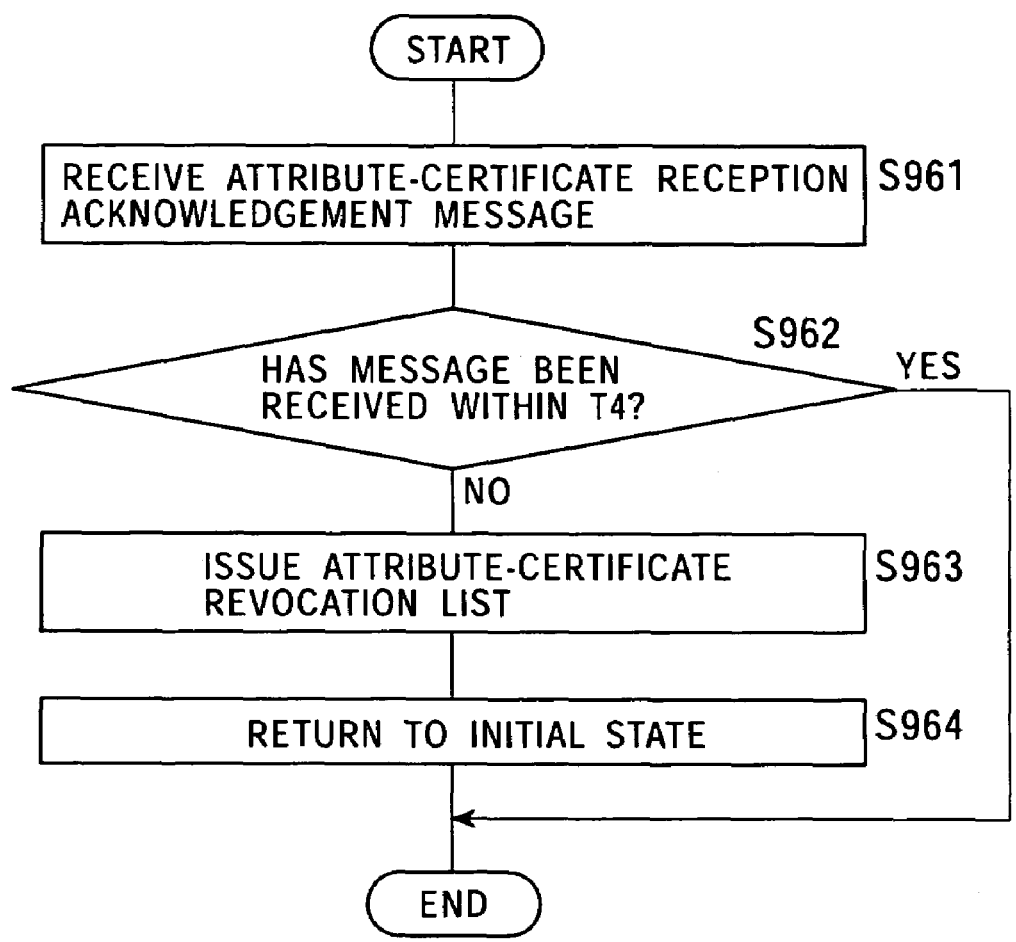
FIG. 15 is a flowchart illustrating attribute-certificate revocation processing performed by terminal A in the embodiment of the present invention.

FIG. 15 is a flowchart illustrating the attribute-certificate revocation processing performed by the terminal A shown in FIG. 9. In step S961, the terminal A receives the attribute-certificate reception acknowledgement message from the terminal B sent in step S956 of FIG. 14. The terminal A then determines in step S962 whether the time from when the attribute-certificate issuing message is sent to when the attribute-certificate reception acknowledgement is received is within the predetermined time T4. If the outcome of step S962 is no, in step S963, the terminal A issues the attribute-certificate revocation list 730 to revoke the attribute certificate issued by the attribute-certificate issuing message in step S946. The terminal A then returns to the initial state in step S964.

If it is found in step S962 that the attribute-certificate reception acknowledgement message has been received within the predetermined time T4, the terminal A determines that the issued attribute certificate is valid, and the registration process is completed. Accordingly, the terminal B is allowed to connect to the network by using the attribute certificate issued by the terminal A.

According to the above-described embodiment of the present invention, when receiving an issuance of an attribute certificate from the terminal A by the terminal B, both the terminals A and B proceed with the processing after checking that the distance between the terminals A and B is within the predetermined distance. Thus, the attribute-certificate issuing processing can be performed by ensuring the distance between the two terminals is within the predetermined distance.

Figure 16:
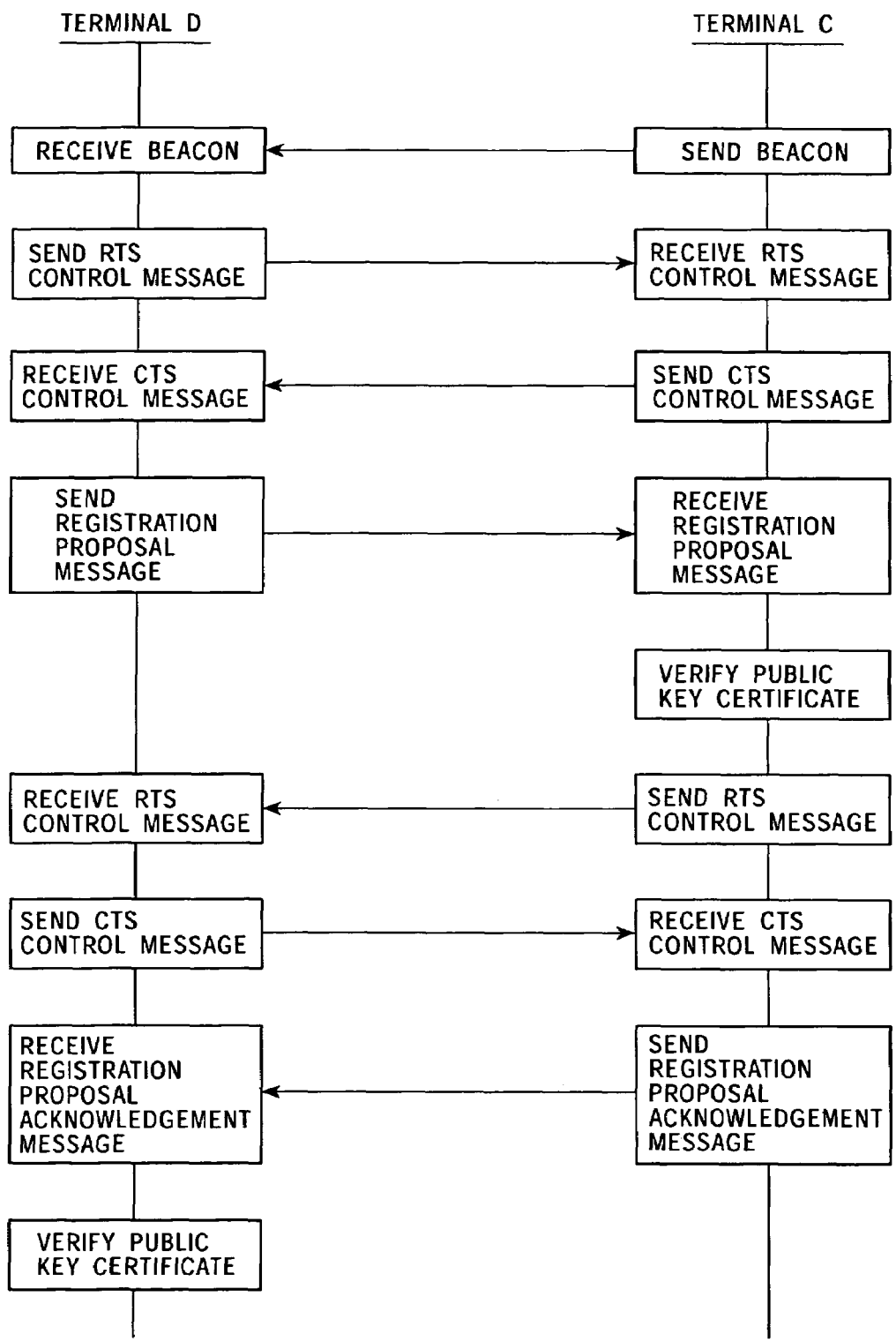
FIG. 16 illustrates another example of the authentication process in the embodiment of the present invention.

FIG. 16 illustrates another example of the authentication process in this embodiment. In FIG. 16, a terminal D is an attribute-certificate issuing terminal, which has already entered the network, and a terminal C is a terminal, which is to enter the network.

This authentication process is started by receiving a beacon from the terminal C by the terminal D. In a wireless communication system having a base station, the base station transmits a beacon, and the sub stations receive the beacon. In a wireless ad-hoc communication system without a base station, each terminal transmits a beacon to the other terminals so that the presence of each terminal can be made known to the other terminals. In this embodiment, the beacon includes, not only a beacon signal containing beacon information, but also data information added to the beacon information.

The terminal D receives the beacon sent from the terminal C. The configuration of the beacon is based on the configuration of the frame 800 shown in FIG. 7. In this beacon frame, the frame type 805 of the header 801 indicates that this frame is a beacon frame. After the frame type 805, the header 801 stores the identifier of the type of attribute certificate owned by the beacon transmission terminal (terminal C). As this identifier, for example, the identifier of the terminal that has issued the attribute certificate can be used. If a valid terminal identifier is not stored in this identifier field (for example, if only 0s are indicated in the identifier field), it means that the beacon transmission terminal (terminal C) does not own an attribute certificate.

Upon receiving the beacon from the terminal C, the terminal D performs ranging to determine the current distance with the terminal C. In order to measure this distance, the terminal D communicates with the terminal C. In the example shown in FIG. 16, a request-to-send (RTS) control message and a clear-to-send (CTS) control message are used as access control packets for performing ranging. The RTS control message and the CTS control message are originally used for avoiding the contention between stations in wireless communication. A transmission terminal sends a RTS control message before sending data, and a reception terminal returns a CTS control message in response to the RTS control message. The other stations, which have not received the RTS control message, can also identify by receiving the CTS control message that a certain station has started to send data, thereby preventing interrupts. In this embodiment, by utilizing this mechanism, the time from when a RTS control message is sent to when a CTS control message is received is measured by using the timer 335 (FIG. 1), and the distance can be calculated from the measured time.

For example, the distance $D_{cd}$ between the terminal C and the terminal D can be calculated by the following equation:

$$D_{cd} = (½) V T_{TAT}$$

where $T_{TAT}$ represents the time from when the RTS control message is sent to when the CTS control message is received, and V designates the radio propagation velocity.

The radio propagation velocity V is $3 \times 10^8$ m, and thus, if the time $T_{TAT}$ is 100 ns, the distance $D_{cd}$ can be calculated as follows:

$$D_{cd} = (½) \times (3 \times 10^8) \times (100 \times 10^{-9}) = 15 \text{ m}.$$

Then, the distance between the terminal C and the terminal D is found to be 15 m.

The configuration of the RTS control message is based on the configuration of the frame 800 shown in FIG. 7. In the RTS frame, the frame type 805 of the header 801 indicates that this frame is a RTS frame. The same applies to the configuration of the CTS control message. In the CTS frame, the frame type 805 of the header 801 indicates that this frame is a CTS frame.

The terminal D sends a RTS control message to the terminal C. Upon receiving the RTS control message, the terminal C returns a CTS control message to the terminal D. The terminal D receives the CTS control message from the terminal C, and measures the time from when the RTS control message is sent to when the CTS control message is received by using the timer 335, thereby calculating the distance with the terminal C.

If the distance with the terminal C is within a predetermined distance X1, the terminal D sends a registration proposal message to the terminal C. By restricting the distance with the terminal C within the predetermined distance X1, the registration proposal message can be prevented from being sent to unnecessary terminals. The configuration of the registration proposal message is based on the configuration of the frame 800 shown in FIG. 7. In the registration frame, the frame type 805 of the header 801 indicates that this frame is a registration frame. The data 809 of the payload 802 includes the public key certificate of the terminal D.

Upon receiving the registration proposal message from the terminal D, the terminal C verifies the public key certificate of the terminal D contained in the registration proposal message. After verifying the integrity of the terminal D, the terminal C measures the current distance with the terminal D. To measure this distance, the terminal C sends a RTS control message to the terminal D in a manner similar to the above-described operation of the terminal D.

Upon receiving the RTS control message from the terminal C, the terminal D returns a CTS control message to the terminal C in response to the RTS control message. Upon receiving the CTS control message from the terminal D, the terminal C measures the time from when the RTS control message is sent to when the CTS control message is received by using the timer 335, thereby calculating the distance with the terminal D.

If the distance with the terminal D is within the predetermined distance X2, the terminal C sends a registration proposal acknowledgement message to the terminal D. By restricting the distance with the terminal D within the predetermined distance X2, the registration proposal acknowledgement message can be prevented from being sent to unnecessary terminals. The configuration of the registration proposal acknowledgement message is based on the configuration of the frame 800 shown in FIG. 7. In the registration proposal acknowledgement frame, the frame type 805 of the header 801 indicates that this frame is a registration proposal acknowledgement frame. The data 809 of the payload 802 includes the public key certificate of the terminal C.

The terminal D receives the registration proposal acknowledgement message from the terminal C. If the time from when the registration proposal message is sent to when the registration proposal acknowledgement message is received is within the predetermined time T1, the terminal D verifies the public key certificate of the terminal C contained in the registration proposal acknowledgement message. The reason for restricting the message response time within the predetermined time T1 is to assume the situation in which there may be no response due to a change in the communication status.

After verifying the integrity of the terminal C, the integrity of both the terminal C and the terminal D is authenticated.

Figure 17:
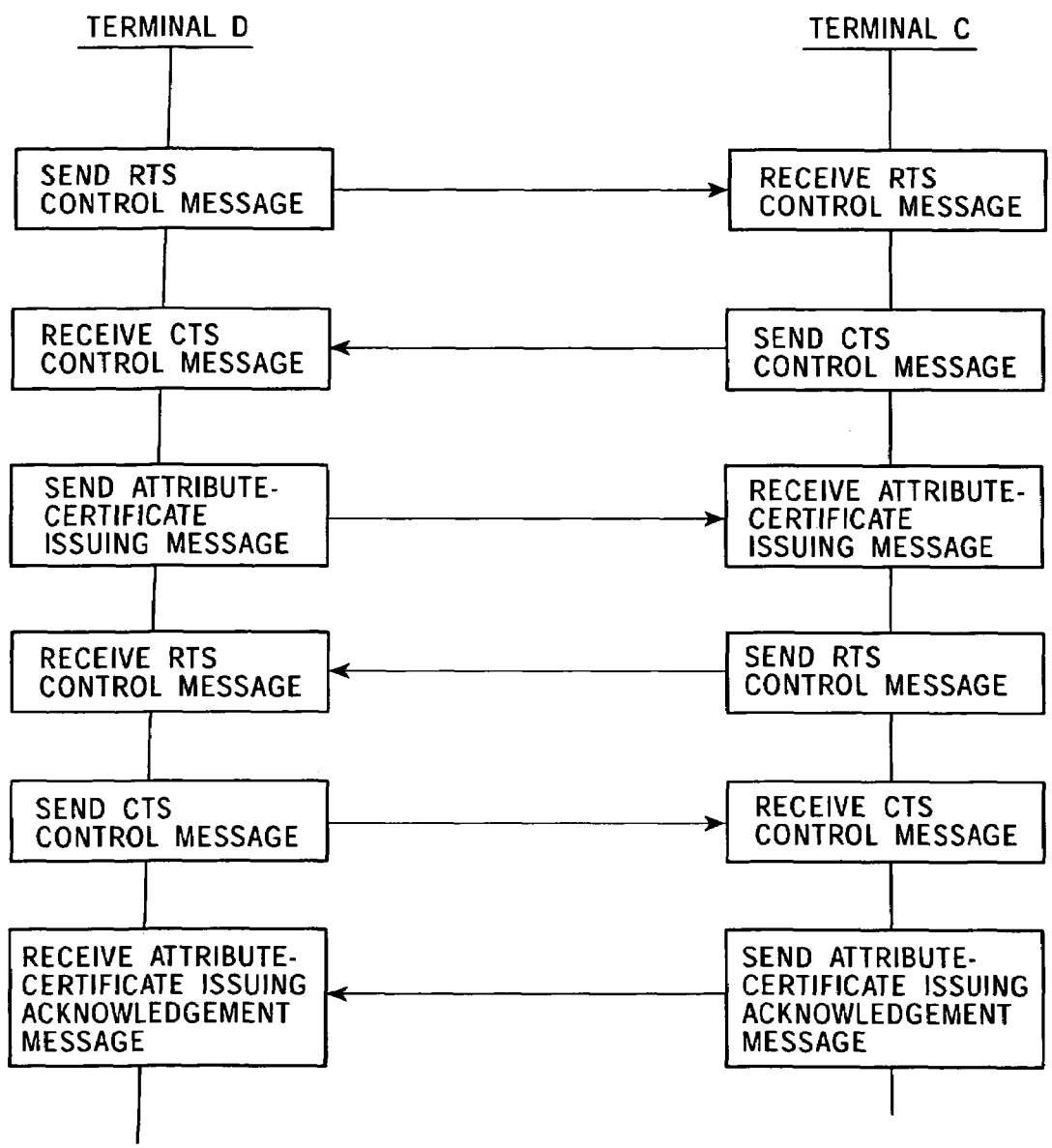
FIG. 17 illustrates another example of the registration process in the embodiment of the present invention.

FIG. 17 illustrates another example of the registration process of this embodiment. After verifying the integrity of the terminal C in FIG. 16, the terminal D performs ranging to determine the current distance with the terminal C. In order to measure this distance, the terminal D sends a RTS control message to the terminal C, as in the authentication process.

Upon receiving the RTS control message from the terminal D, the terminal C sends a CTS control message to the terminal D. Upon receiving the CTS control message from the terminal C, the terminal D measures the time from when the RTS control message is sent to when the CTS control message is received by using the timer 335, thereby calculating the distance with the terminal C.

If the distance with the terminal C is within the distance X3, the terminal D issues an attribute certificate to the terminal C, and sends an attribute-certificate issuing message to the terminal C. By restricting the distance with the terminal C within the predetermined distance X3, the attribute-certificate issuing message can be prevented from being sent to unnecessary terminals. The configuration of the attribute-certificate issuing message is based on the configuration of the frame 800 shown in FIG. 7. In the attribute-certificate issuing frame, the frame type 805 of the header 801 indicates that this frame is an attribute-certificate issuing frame. The data 809 of the payload 802 includes an attribute certificate issued to the terminal C and a public key certificate of the terminal D.

The terminal C receives the attribute-certificate issuing message from the terminal D, and if the time from when the registration proposal acknowledgement message is sent to when the attribute-certificate issuing message is received is within the predetermined time T2, the terminal C measures the current distance with the terminal D. In order to measure this distance, the terminal C sends a RTS control message to the terminal D, as in the above-described operation. The reason for restricting the message response time within the predetermined time T2 is to assume the situation in which there may be no response due to a change in the communication status.

In response to the RTS control message from the terminal C, the terminal D sends a CTS control message to the terminal C. The terminal C then determines the time from when the RTS control message is sent to when the CTS control message is received by using the timer 335, thereby calculating the distance with the terminal D.

If the distance with the terminal D is within the predetermined distance X4, the terminal C receives the attribute certificate issued from the terminal D. By restricting the distance with the terminal D within the predetermined distance X4, the attribute certificate can be prevented from being issued from unnecessary terminals.

If the terminal C receives the attribute certificate from the terminal D, it sends an attribute-certificate issuing acknowledgement message indicating that the attribute certificate has been received. If the terminal C does not receive the attribute certificate, it sends an attribute-certificate issuing acknowledgement message indicating that the attribute certificate has been rejected. The configuration of the attribute-certificate issuing acknowledgement message is based on the configuration of the frame 800 shown in FIG. 7. In the attribute-certificate issuing acknowledgement frame, the frame type 805 of the header 801 indicates that this frame is an attribute-certificate issuing acknowledgement frame. The data 809 of the payload 802 includes the reception result.

The terminal D receives the attribute-certificate issuing acknowledgement message, and if the time from when the attribute-certificate issuing message is sent to when the attribute-certificate issuing acknowledgement message is received is within the predetermined time T4, the terminal D determines the issued attribute certificate as a valid certificate. If the terminal D cannot receive an attribute-certificate issuing acknowledgement message from the terminal C after the lapse of the predetermined time T4, the terminal D issues the attribute-certificate revocation list 730 to revoke the issued attribute certificate. The reason for restricting the message response time within the predetermined time T4 is to assume the situation in which there may be no response due to a change in the communication status.

The processing performed by the terminals C and D in the wireless communication system in this embodiment is described below.

Figure 18:
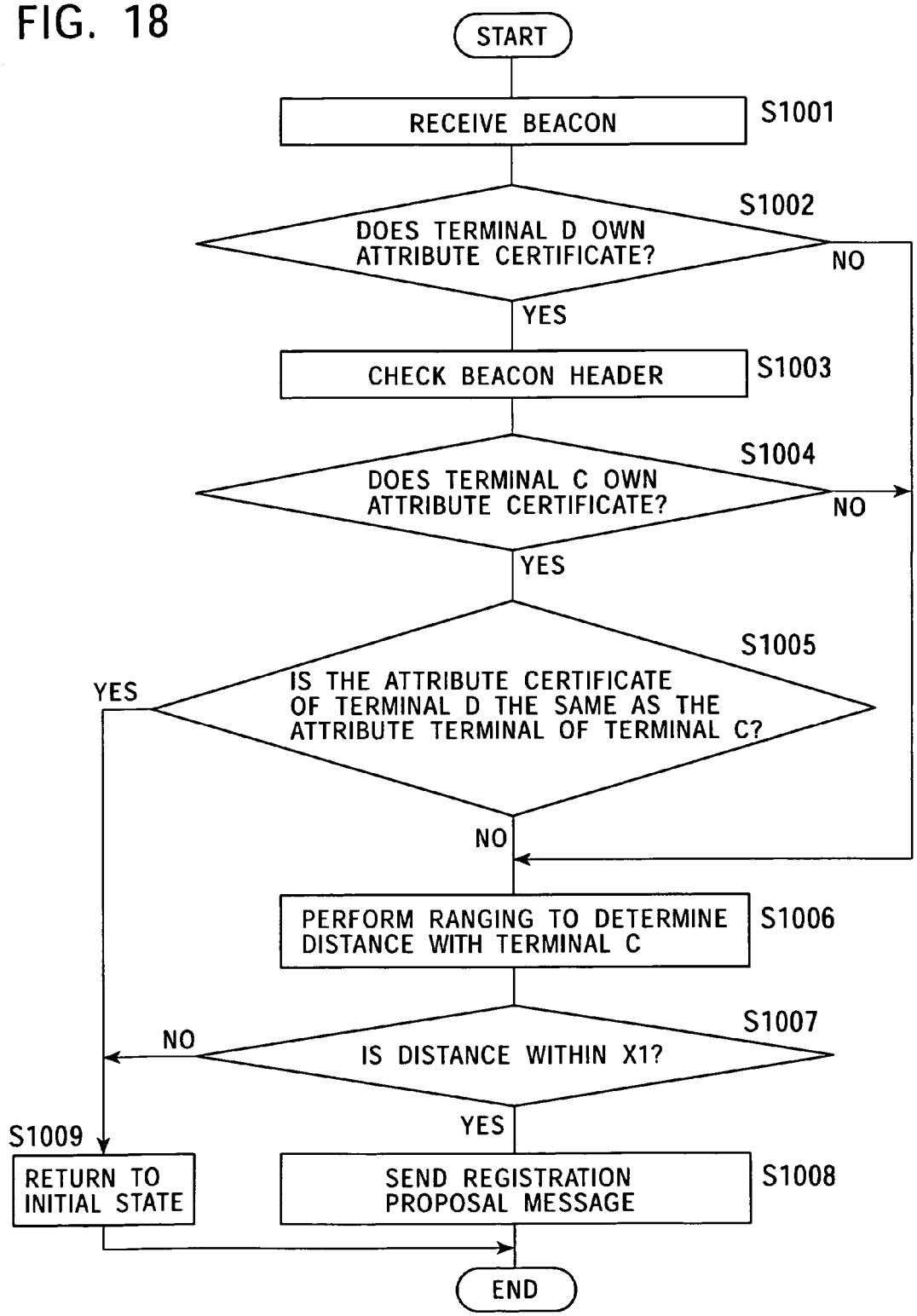
FIG. 18 is a flowchart illustrating registration proposal processing performed by terminal D in the embodiment of the present invention.

FIG. 18 is a flowchart illustrating the registration proposal processing performed by the terminal D shown in FIG. 16. Upon receiving a beacon from the terminal C in step S1001, the terminal D determines in step S1002 whether the terminal C owns an attribute certificate. If the terminal C is found to own an attribute certificate in step S1002, the terminal D checks the beacon header in step S1003. The terminal D then determines in step S1004 whether the terminal D owns an attribute certificate. If the outcome of step S1004 is yes, the terminal D further determines in step S1005 whether the attribute certificate of the terminal C has been issued by the same issuer which has issued the attribute certificate of the terminal D.

If the attribute certificate of the terminal C and the attribute certificate of the terminal D have been issued by the same issuer, it means that the terminal C already has a valid attribute certificate, and thus, the terminal D returns to the initial state without performing further processing in step S1009. If it is found in step S1002 or step S1004 that the terminal C or the terminal D does not own an attribute certificate, or if it is found in step S1005 that the issuers (attribute certificate authorities) of the attribute certificates of the terminal C and the terminal D are different, the process proceeds to step S1006 in which the terminal D measures the distance with the terminal C. In order to measure this distance, the terminal D communicates with the terminal C, as described above, by using, for example, RTS control messages and CTS control messages.

The terminal D then determines in step S1007 whether the distance with the terminal C is within the predetermined distance X1. If the outcome of step S1007 is yes, the terminal D sends a registration proposal message to the terminal C in step S1008. If the distance with the terminal C is found to exceed the predetermined distance X1 in step S1007, the terminal D returns to the initial state without performing further processing in step S1009.

Figure 19:
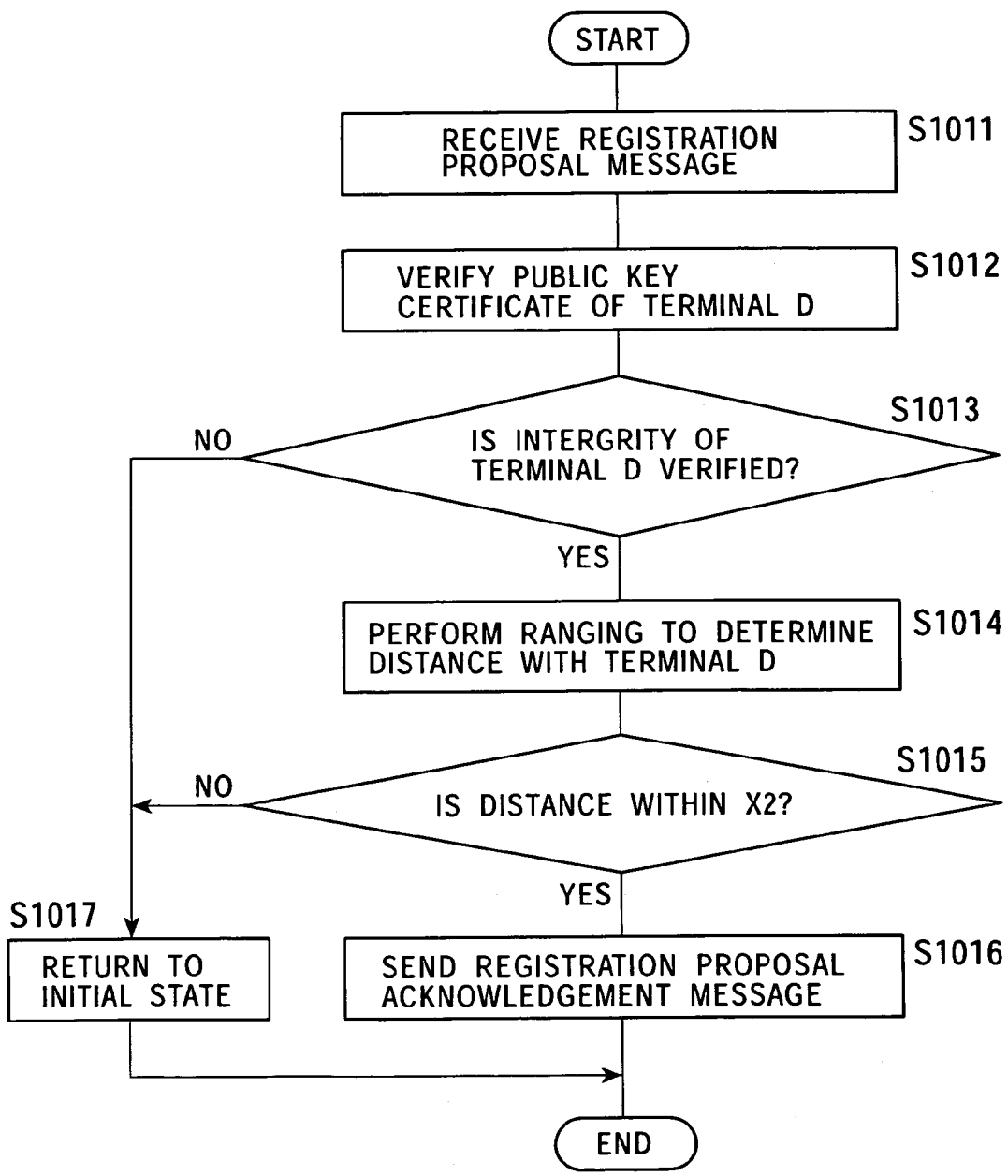
FIG. 19 is a flowchart illustrating registration proposal acknowledgement processing performed by terminal C in the embodiment of the present invention.

FIG. 19 is a flowchart illustrating the registration proposal acknowledgement processing performed by the terminal C shown in FIG. 16. Upon receiving a registration proposal message from the terminal D in FIG. 16 (step S1011 of FIG. 19), the terminal C verifies the public key certificate of the terminal D contained in the registration proposal message in step S1012. In this case, the public key of the certificate authority is used for verifying the public key certificate. The terminal C determines in step S1013 whether the integrity of the terminal D can be verified, and if the outcome of step S1013 is yes, the terminal C measures the distance with the terminal D in step S1014. If the integrity of the terminal D cannot be verified in step S1013, the terminal C returns to the initial state without performing further processing in step S1017.

The terminal C then determines in step S1015 whether the distance with the terminal D is within the predetermined distance X2. If the result of step S1015 is yes, the terminal C sends a registration proposal acknowledgement message to the terminal D in step S1016. If the measured distance with the terminal D is found to exceed the predetermined distance X2 in step S1015, the terminal C returns to the initial state without performing further processing in step S1017.

Figure 20:
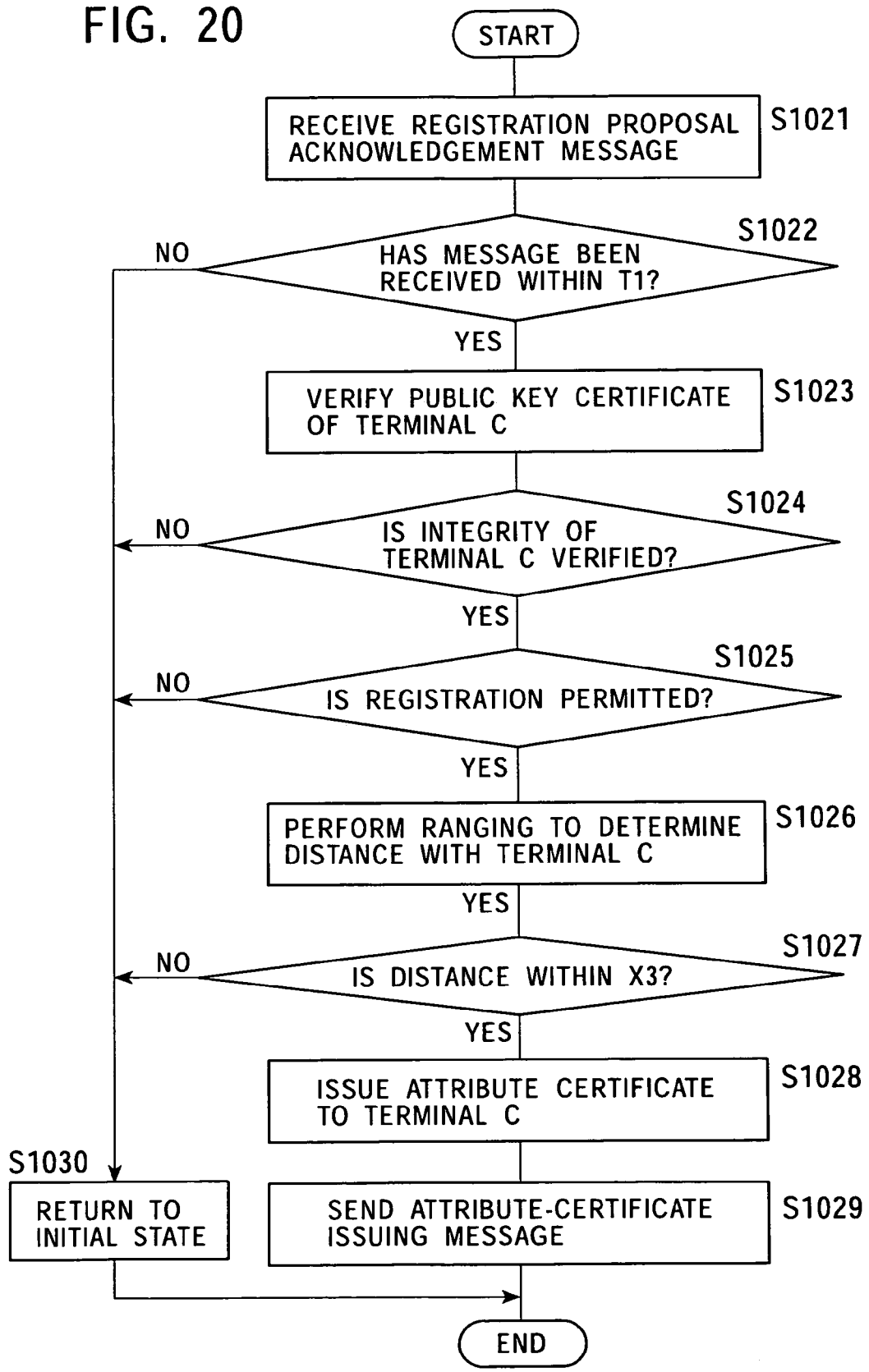
FIG. 20 is a flowchart illustrating attribute-certificate issuing processing performed by terminal D in the embodiment of the present invention.

FIG. 20 is a flowchart illustrating the attribute-certificate issuing processing performed by the terminal D shown in FIGS. 16 and 17. In step S1021, the terminal D receives the registration proposal acknowledgement message from the terminal C. The terminal D then determines in step S1022 whether the time from when the registration proposal message is sent to when the registration proposal acknowledgement message is received is within the predetermined T1. If the outcome of step S1022 is yes, the terminal D verifies the public key certificate of the terminal C contained in the registration proposal acknowledgement message in step S1023. If it is found in step S1022 that the registration proposal acknowledgement message cannot be received within the predetermined time T1, the terminal D returns to the initial state in step S1030.

The terminal D then determines in step S1024 whether the integrity of the terminal C is verified. If the result of step S1024 is yes, the terminal D activates a registration permission mechanism in the terminal D. This registration permission mechanism is a mechanism for allowing the terminal D to request the issuance of an attribute certificate. For example, a message indicating a permission to make a request to issue an attribute certificate (not shown) can be displayed on the display unit 340 of the terminal D, or a vibrator mechanism can be operated, thereby instructing the user to input a registration permission from the operation unit 350. If it is found in step S1024 that the integrity of the terminal C cannot be verified, the terminal D returns to the initial state in step S1030.

Then, the terminal D determines in step S1025 whether a registration permission is input by using the above-described registration permission mechanism. If not, it is assumed that the user does not wish the issuance of an attribute certificate, and the terminal D returns to the initial state without performing further processing in step S1030.

If a registration permission is input in step S1025, the terminal D performs ranging to measure the distance with the terminal C in step S1026. The terminal D then determines in step S1027 whether the distance with the terminal C is within the predetermined distance X3. If the result of step S1027 is yes, the terminal D issues an attribute certificate to the terminal C in step S1028. In step S1029, the terminal D sends an attribute-certificate issuing message to the terminal C. If the distance with the terminal C is found to exceed the predetermined distance X3 in step S1027, the terminal D returns to the initial state without performing further processing in step S1030.

Figure 21:
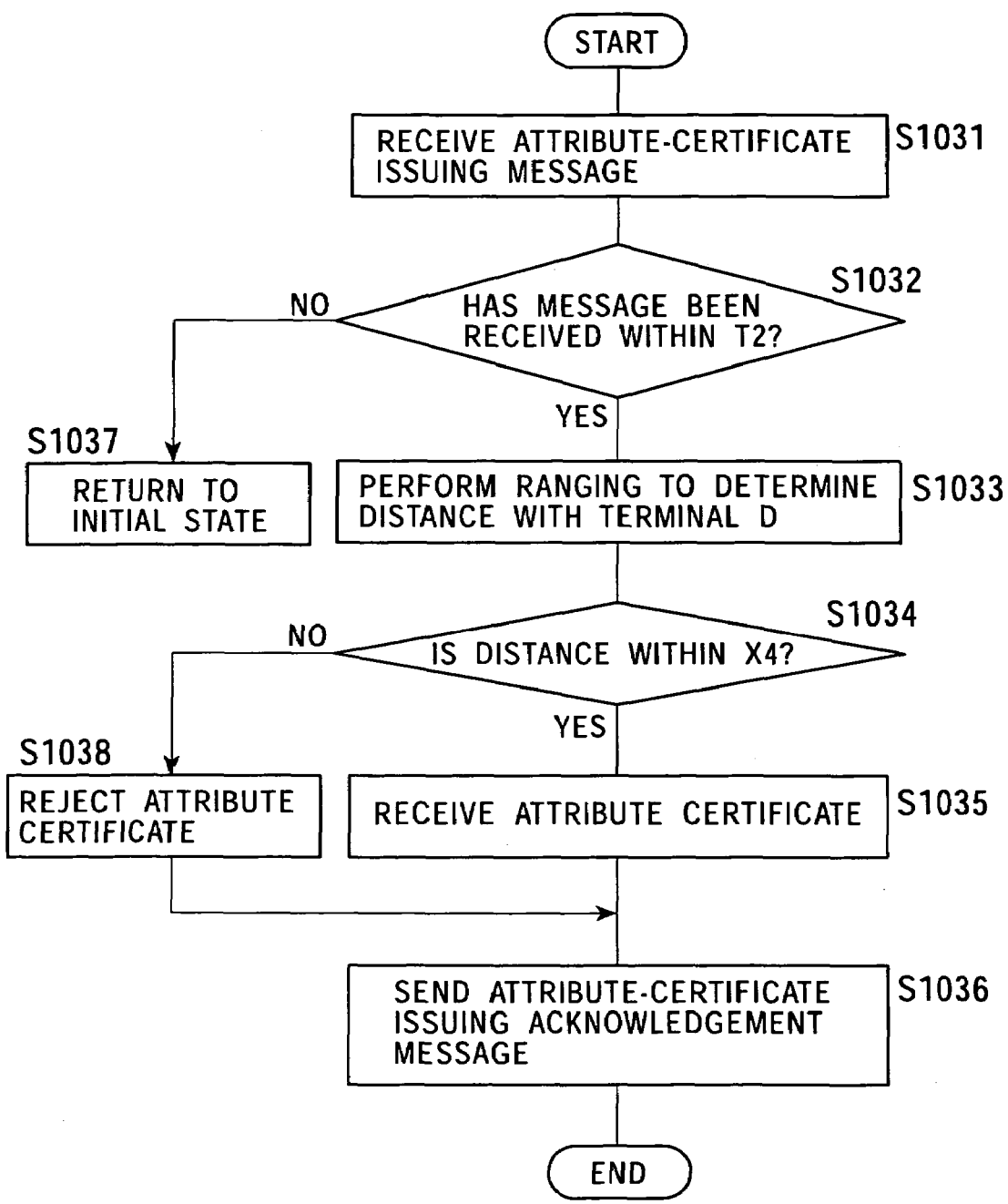
FIG. 21 is a flowchart illustrating attribute-certificate issuing processing performed by terminal C in the embodiment of the present invention.

FIG. 21 is a flowchart illustrating the attribute-certificate issuing processing performed by the terminal C shown in FIG. 17. In step S1031, the terminal C receives an attribute-certificate issuing message from the terminal D. The terminal C then determines in step S1032 whether the time from when the registration proposal acknowledgement message is sent to the time when the attribute-certificate issuing message is received is within the predetermined time T2. If the outcome of step S1032 is yes, the terminal C measures the distance with the terminal D in step S1033. If the terminal C cannot receive the attribute-certificate issuing message within the predetermined time T2 in step S1032, it returns to the initial state in step S1037.

The terminal C then determines in step S1034 whether the distance with the terminal D is within the predetermined distance X4. If the result of step S1034 is yes, the terminal C receives an attribute certificate in step S1035, and sends an attribute-certificate reception acknowledgement message indicating that the message has been received to the terminal D in step S1036. If the distance with the terminal D is found to exceed the predetermined distance X4 in step S1034, the terminal C rejects the reception of the attribute certificate in step S1038, and sends an attribute-certificate reception acknowledgement message indicating that the attribute certificate has been rejected to the terminal D in step S1036.

Figure 22:
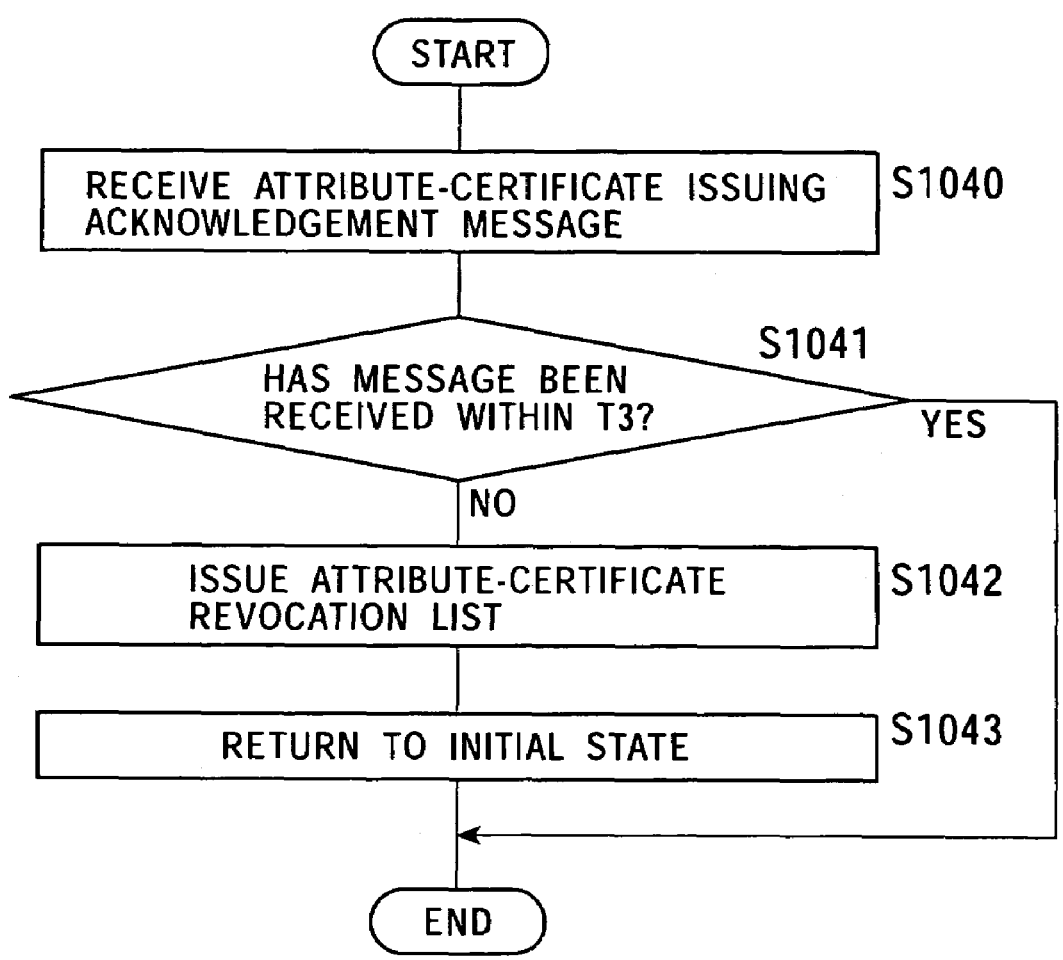
FIG. 22 is a flowchart illustrating attribute-certification revocation processing performed by terminal D in the embodiment of the present invention.

FIG. 22 is a flowchart illustrating the attribute-certificate revocation processing performed by the terminal D. In step S1040, the terminal D receives an attribute-certificate reception acknowledgement message. The terminal D then determines in step S1041 whether the time from when the attribute-certificate issuing message is sent to the time when the attribute-certificate reception acknowledgement message is received is within the predetermined time T3. If the result of step S1041 is no, the terminal D issues the attribute-certificate revocation list 730 to revoke the attribute certificate issued by the attribute-certificate issuing message in step S1042, and returns to the initial state in step S1043.

If it is found in step S1041 that the terminal D has received the attribute-certificate reception acknowledgement message within the predetermined time T3, it determines the issued attribute certificate as a valid certificate, and completes the registration processing. After this processing, the terminal C is able to connect to a network by using the attribute certificate issued from the terminal D.

In this embodiment, the distance between terminals is measured by using access control packets (a RTS control message and a CTS control message). Alternatively, the time required from when a signal is transmitted from one terminal to when a response signal (for example, ACK signal) is returned from the other terminal may be measured.

While the present invention has been described with reference to what is presently considered to be the preferred embodiment, it is to be understood that the invention is not limited to the disclosed embodiment. Various modifications can be made without departing from the spirit of the present invention.

A series of processes disclosed in this specification may be considered as a method having such a series of processes, or as a program for allowing a computer to execute such a series of processes, or as a recording medium storing such a program.

What is claimed is:

1. A wireless communication system including a plurality of terminals, comprising:
a first terminal configured to send a signal including beacon information; and
a second terminal configured to perform ranging to determine a distance with the first terminal in response to the signal, and to make a registration request to the first terminal when the determined distance is within a first predetermined range,
wherein the first terminal is configured to perform ranging to determine a distance with the second terminal in response to the registration request, and to return an acknowledgement of the registration request to the second terminal when the determined distance is within a second predetermined range,
the second terminal is configured to perform ranging to determine the distance with the first terminal in response to the acknowledgement, and to make an issuance request to issue a certificate of privilege to the first terminal when the determined distance is within a third predetermined range, and
the first terminal is configured to perform ranging to determine the distance with the second terminal in response to the issuance request, and to issue a certificate of privilege to the second terminal when the determined distance is within a fourth predetermined range.

2. A wireless communication system according to claim 1, wherein:
the second terminal is configured to perform ranging to determine the distance with the first terminal in response to the issuance of the certificate of privilege, and to return a reception acknowledgement of the certificate of privilege to the first terminal when the determined distance is within a fifth predetermined range; and
the first terminal is configured to issue a revocation list of the certificate of privilege when the reception acknowledgement is not returned from the second terminal within a predetermined period after issuing the certificate of privilege.

3. A wireless communication system including a plurality of terminals, comprising:
a fourth terminal configured to send a signal including beacon information; and
a third terminal configured to perform ranging to determine a distance with the fourth terminal in response to the signal, and to make a registration proposal to the fourth terminal when the determined distance is within a predetermined range,
the third terminal being configured to perform ranging to determine the distance with the fourth terminal in response to an acknowledgement from the fourth terminal, and to issue a certificate of privilege to the fourth terminal when the determined distance is within a third predetermined range; and
the fourth terminal being configured to perform ranging to determine a distance with the third terminal in response to the issuance of the certificate of privilege, and to receive the certificate of privilege when the determined distance is within a fourth predetermined range.

4. A wireless communication system according to claim 3, wherein:
the fourth terminal is configured to return an issuing acknowledgement of the certificate of privilege to the third terminal when receiving the certificate of privilege issued from the third terminal; and
the third terminal is configured to issue a revocation list of the certificate of privilege when the issuing acknowledgement is not returned from the fourth terminal within a predetermined period after issuing the certificate of privilege.

5. A message sending method, comprising:
a step of receiving a signal including beacon information from a first terminal;
a step of performing ranging to determine a distance with the first terminal at a first time;
a step of sending a registration request message to the first terminal when the determined distance at the first time is within a first predetermined range;
a step of receiving a registration request acknowledgement message from the first terminal in response to the registration request message;
a step of performing ranging to determine a distance with the first terminal at a second time; and a step of sending a certificate-of-privilege issuing request message to the first terminal when the determined distance at the second time is within a second predetermined range.

6. A message sending method, comprising:
a step of receiving a signal including beacon information from a first terminal;
a step of performing ranging to determine a distance with the first terminal at a first time;
a step of sending a registration proposal message to the first terminal when the determined distance at the first time is within a first predetermined range;
a step of receiving a registration proposal acknowledgement message from the first terminal in response to the registration proposal message;
a step of performing ranging to determine a distance with the first terminal at a second time; and
a step of issuing a certificate of privilege to the first terminal and sending a certificate-of-privilege issuing message to the first terminal when the determined distance at the second time is within a second predetermined range.

7. A computer readable storage medium, including computer executable instructions, wherein the instructions, when executed by a processor, cause the processor to perform a method, comprising:
a step of receiving a signal including beacon information from a first terminal;
a step of performing ranging to determine a distance with the first terminal at a first time;
a step of sending a registration request message to the first terminal when the determined distance at the first time is within a first predetermined range;
a step of receiving a registration request acknowledgement message from the first terminal in response to the registration request message;
a step of performing ranging to determine a distance with the first terminal at a second time; and
a step of sending a certificate-of-privilege issuing request message to the first terminal when the determined distance at the second time is within a second predetermined range.

8. A computer readable storage medium, including computer executable instructions, wherein the instructions, when executed by a processor, cause the processor to perform a method, comprising:
a step of receiving a signal including beacon information from a first terminal;
a step of performing ranging to determine a distance with the first terminal at a first time;
a step of sending a registration proposal message to the first terminal when the determined distance at the first time is within a first predetermined range;
a step of receiving a registration proposal acknowledgement message from the first terminal in response to the registration proposal message;
a step of performing ranging to determine a distance with the first terminal at a second time; and
a step of issuing a certificate of privilege and sending a certificate-of-privilege issuing message to the first terminal when the determined distance at the second time is within a second predetermined range.

* * * * *